(12) United States Patent
Silverwood et al.

(10) Patent No.: US 11,912,186 B2
(45) Date of Patent: Feb. 27, 2024

(54) MODULAR TRAY TABLE WITH ROTATIONAL DISPLACEMENT MECHANISM

(71) Applicant: Adient Aerospace, LLC, Bothell, WA (US)

(72) Inventors: Neal Silverwood, Cardiff (GB); Simon D. Allen, Frimley (GB)

(73) Assignee: Adient Aerospace, LLC, Bothell, WA (US)

( * ) Notice: Subject to any disclaimer, the term of this patent is extended or adjusted under 35 U.S.C. 154(b) by 71 days.

(21) Appl. No.: 17/700,025

(22) Filed: Mar. 21, 2022

(65) Prior Publication Data

US 2023/0294583 A1   Sep. 21, 2023

(51) Int. Cl.
*B60N 3/00* (2006.01)
*B64D 11/06* (2006.01)
*B63B 29/04* (2006.01)
*B64G 1/60* (2006.01)

(52) U.S. Cl.
CPC .............. *B60N 3/002* (2013.01); *B63B 29/04* (2013.01); *B63B 2029/046* (2013.01); *B64D 11/0638* (2014.12); *B64G 1/60* (2013.01)

(58) Field of Classification Search
CPC .......... A47B 5/00; A47B 31/06; B60N 3/001; B60N 3/002; B63B 29/04; B63B 2029/046; B64G 1/60
USPC .......................... 108/42, 44, 45; 297/147, 149
See application file for complete search history.

(56) References Cited

U.S. PATENT DOCUMENTS

| | | | | |
|---|---|---|---|---|
| 4,944,552 A * | 7/1990 | Harris | ................ | B64D 11/0638 297/145 |
| 8,528,968 B2 * | 9/2013 | Moulton | ............ | B64D 11/0605 297/147 |
| 8,616,137 B2 * | 12/2013 | Collins | .............. | B64D 11/0601 297/135 |
| 9,102,410 B2 * | 8/2015 | Frost | ...................... | B60N 2/242 |
| 9,216,665 B2 * | 12/2015 | Herault | ............. | B64D 11/0606 |
| 10,023,315 B2 * | 7/2018 | Kuyper | .................. | B64D 11/06 |
| 10,926,880 B1 * | 2/2021 | Mayne | ................... | A47B 31/06 |
| 11,091,267 B1 * | 8/2021 | Lawson | ............ | B64D 11/0605 |
| 11,577,837 B1 * | 2/2023 | Lawson | ............ | B64D 11/0605 |
| 11,597,522 B2 * | 3/2023 | Frost | ..................... | B60N 3/002 |
| 11,701,990 B1 * | 7/2023 | Mann | .................... | B60N 3/001 312/313 |

(Continued)

*Primary Examiner* — Jose V Chen
(74) *Attorney, Agent, or Firm* — Jordan IP Law, LLC

(57) ABSTRACT

Examples provide a modular tray table apparatus associated with a console of a seat unit. A tray table carrier unit is removably mounted to a portion of the console. A tray table support element is coupled to the carrier unit and a tray table. The tray table support element movably supports the tray table. A linear displacement mechanism is disposed between the tray table and the tray table support element. The tray table slides along a linear displacement path between a fully retracted configuration and at least one deployed configuration. A rotational displacement mechanism disposed between the tray table and the tray table support element. The tray table slides along a rotational displacement path defined by at least one rotational guide between a linear configuration of the tray table and a substantially perpendicular configuration of the tray table when the tray table is in a fully deployed configuration.

20 Claims, 24 Drawing Sheets

(56) References Cited

U.S. PATENT DOCUMENTS

| | | | | |
|---|---|---|---|---|
| 2009/0078169 A1* | 3/2009 | Osborne | ................ | B61D 37/00 |
| | | | | 108/70 |
| 2009/0223417 A1* | 9/2009 | Muirhead | ........ | B64D 11/00153 |
| | | | | 108/11 |
| 2010/0319588 A1* | 12/2010 | Hanna | .................... | B60N 3/001 |
| | | | | 108/20 |
| 2011/0148156 A1* | 6/2011 | Westerink | .............. | B64D 11/06 |
| | | | | 108/134 |
| 2013/0093221 A1* | 4/2013 | Ligonniere | ............ | B64D 11/06 |
| | | | | 297/173 |
| 2014/0261097 A1* | 9/2014 | Eilers | ..................... | B60N 3/001 |
| | | | | 108/44 |
| 2015/0274299 A1* | 10/2015 | Henshaw | ........... | B64D 11/0606 |
| | | | | 244/118.6 |
| 2015/0284089 A1* | 10/2015 | Gow | .................. | B64D 11/0638 |
| | | | | 297/147 |
| 2015/0321592 A1* | 11/2015 | De Morais | ......... | B64D 11/0646 |
| | | | | 297/135 |
| 2015/0351528 A1* | 12/2015 | Gow | ...................... | B60N 3/002 |
| | | | | 297/135 |
| 2018/0279779 A1* | 10/2018 | Foohey | ................... | B60N 3/002 |
| 2018/0281962 A1* | 10/2018 | Pozzi | ................ | B64D 11/0638 |
| 2019/0061955 A1* | 2/2019 | Wilson | .............. | B64D 11/0646 |
| 2022/0194284 A1* | 6/2022 | Woerz | ................ | B64D 11/0638 |
| 2023/0073445 A1* | 3/2023 | Newbold | ............... | B60N 3/002 |

* cited by examiner

Deployment Sequence:
For 40"-45" pitch

← 2900

| Stage | Linear Travel | Rotation | Comments |
|---|---|---|---|
| Stowed | 0" | 0° | |
| De-latched | 1"-2" | 0° | When PAX de-latches the table it will spring forward a small amount. |
| Linear deployment | 0"-24.5" | 0° to 90° | Rotation allowed during linear deployment |
| Fully deployed | 24.5" | 90° | |

FIG. 29

MODULAR TRAY TABLE WITH ROTATIONAL DISPLACEMENT MECHANISM

BACKGROUND

Tray tables associated with passenger seats within a vehicle are sometimes provided for passenger use while reading, eating, drinking or other activities during travel. Tray tables can be attached via a hinge or other attachment to the back of another passenger seat or arm rest. In this manner, a passenger can fold the tray table down when ready to use. However, these tray tables may be unsteady during use and difficult to stow away when not in use. Other tables may be permanently fixed between passenger seats for use by multiple passengers. In these cases, the tables take up valuable space within the passenger seating area causing inconvenience for passengers when the tables are not in use by passengers.

SUMMARY

The disclosed examples are described in detail below with reference to the accompanying drawing figures listed below. The following summary is provided to illustrate implementations disclosed herein. It is not meant, however, to limit all examples to any particular configuration or sequence of operations. Nor is it intended to identify key features or essential features of the claimed subject matter, nor is it intended to be used as an aid in determining the scope of the claimed subject matter.

Some examples provide a modular tray table apparatus including a tray table carrier unit removably mounted to a console of a seat unit. A tray table support element is coupled to the carrier unit and a tray table. The tray table support element movably supports the tray table along a linear displacement path between a fully retracted configuration and at least one deployed configuration. A rotational displacement mechanism is disposed between the tray table and the tray table support element. The tray table slides along a rotational displacement path defined by at least one rotational guide between a linear configuration of the tray table and a substantially perpendicular configuration of the tray table.

Other examples provide a method for deploying a tray table of a modular tray table apparatus. A decoupling latch associated with the tray table is actuated to disengage a latching device and detach the tray table from the modular tray table apparatus within a console element of associated with a seat unit. The tray table slides along a linear displacement path between a fully retracted configuration of the tray table within the housing and at least one deployed configuration of the tray table outside of the housing. The tray table rotates via a rotational displacement mechanism disposed between the tray table and a tray table support element. The tray table slides along a rotational displacement path defined by at least one rotational guide between a linear configuration of the tray table and a substantially perpendicular configuration of the tray table when in a fully deployed configuration.

Still other examples provide a system for a modular tray table. The system includes a tray table carrier unit removably mounted to a console of a seat unit. A tray table support element is coupled to the carrier unit and a tray table. The tray table support element movably supports the tray table. A linear displacement mechanism is disposed between the tray table and the tray table support element. The tray table slides along a linear displacement path between a fully retracted configuration and at least one deployed configuration. A rotational displacement mechanism is disposed between the tray table and the tray table support element. The tray table slides along a rotational displacement path defined by at least one rotational guide between a linear configuration of the tray table and a substantially perpendicular configuration of the tray table. A latching mechanism is associated with a housing of the modular tray assembly. The latching mechanism holds the tray table within the housing when the tray table is stowed in the retracted configuration.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 29 is an exemplary table illustrating a deployment sequence for a stowed tray table.

Corresponding reference characters indicate corresponding parts throughout the drawings.

DETAILED DESCRIPTION

Figure 1:
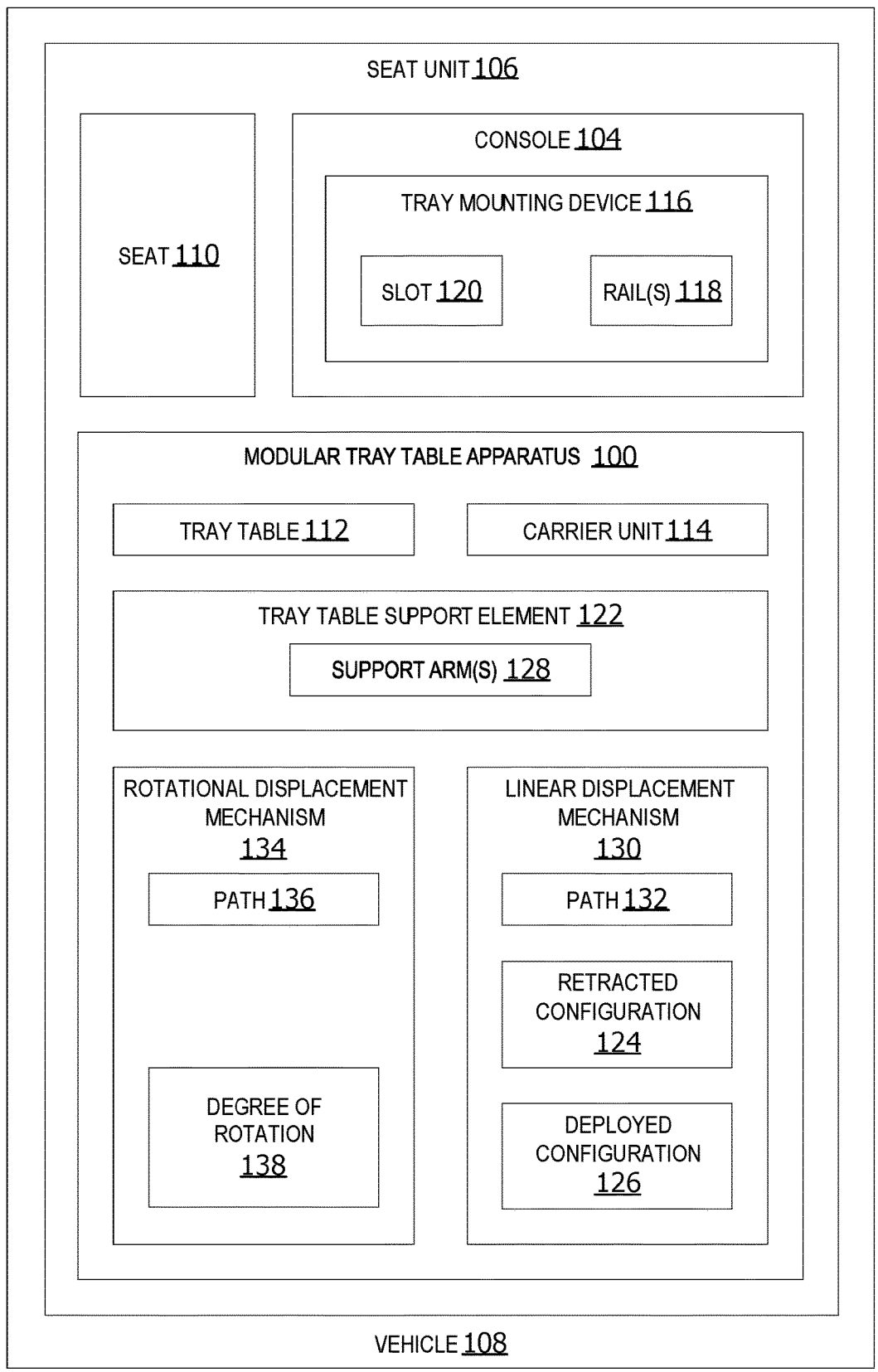
FIG. 1 is an exemplary block diagram illustrating a system for a modular tray table apparatus having a rotational displacement mechanism.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Referring to the figures, examples of the disclosure enable a modular tray table. In some examples, the modular tray table apparatus easily slides into and out of a housing within a console of the passenger seat unit. A handle is pulled to easily release the tray table from the housing. This provides simple and intuitive handling by a passenger.

In other aspects, an improved console element with such a tray table apparatus may be configured as a pre-assembled module which is releasable mountable to the console element. Thereby, assembly and disassembly of the tray table assembly for maintenance work, repair work replacement/exchange of component parts is greatly simplified.

In still other aspects, each tray table is removably mounted within a housing slot of each seat unit console corresponding to a passenger seat. This provides an improved seat unit comprising a seat and a substantially adjacent console element with a modular tray table apparatus which is easily stowable when unneeded and retractable for use by a passenger seated behind the seat unit for greater convenience and reduced tray table space utilization within the passenger seating area.

In some examples, the modular tray table apparatus enables a simple and intuitive table movement for a passenger. Due to the rotational displacement of the table element during movement of the table support element, the time required for a user to deploy or stow the tray table is reduced. When the table support element moves from the retracted position to the deployed position, movement of the table element from the stowed position to the use position is smoothly carried out.

Referring again to FIG. 1, a system for a modular tray table apparatus 100 having a rotational displacement mechanism 102 is shown. The modular tray table apparatus 100 is a modular device which can be installed as a single unit and/or removed as a single unit from a console 104 of a seat unit 106 within a vehicle 108. Likewise, the parts on one modular tray table apparatus 100 are interchangeable with one or more parts on one or more other modular tray tables. In this manner, the modular tray table apparatus is easily installed, removed, repaired and/or serviced (maintenance performed).

The seat unit 106 is a passenger seat unit within the vehicle 108. In some examples, the seat unit 106 includes the furniture, structure, fixtures, base and/or other support members associated with a passenger seat 110. The seat unit 106 can include, for example, but without limitation, the seat 110 for a single passenger to sit on, the console 104, a back wall panel, a side wall panel, a privacy door, an access space/path enabling passenger ingress and egress from the seat and/or seating area around the seat, cup holders, a tray table 112, a display screen/video screen, footrest, back rest, head rest, or any other seat-related devices. In this example, the seat unit 106 includes the modular tray table apparatus 100 installed within a slot of the seat unit 10 and the passenger seat 110.

The passenger seat 110 is a seat, chair, or other surface on which a passenger can sit up, recline and/or lay down. The seat 110 can include a base member, a back member, cushion(s) arm rest(s), and/or a head rest. The passenger seat is optionally a static seat, a swivel seat and/or a reclining seat.

The vehicle 108 is a vehicle for transporting one or more users from a first location to a second location. The vehicle 108 can include any type of vehicle, such as, but not limited to, an aircraft, boat, ship, space liner, bus, or any other type of vehicle. In this non-limiting example, the vehicle is an aircraft. An aircraft can include a commercial airplane, a private airplane, a hover craft, a seaplane, or any other type of aircraft.

In some examples, the tray table carrier unit 114 is removably mounted to the console 104 of the seat unit 110. The tray table carrier unit 114 is a base member of the modular tray table apparatus 100 which mounts into a tray mounting device 116. In some examples, the tray mounting device 116 includes a set of one or more rail(s) 118 on which the modular tray table apparatus 100 is attached via a set of fasteners, such as screws, bolts, or other fasteners. In this example, the tray table carrier unit 114 removably mounts onto the rail(s) 118.

In still other examples, the tray mounting device 116 defines a slot 120 or other open space within a portion of the console 104 sized to accommodate a housing of the modular tray table apparatus 100. In some examples, the modular tray table apparatus 100 removably mounts onto the rail(s) 118 within the rectangular or cassette-shaped slot 120 of the tray mounting device 116 within the console 104. The slot 120 in this example is sized to accommodate the exterior dimensions (size and shape) of the modular tray table apparatus 100.

In other examples, a tray table support element 122 coupled to the carrier unit 114 at a first end and coupled to the tray table 112 at a second end of the tray table support element 122. The tray table support element 122 movably supports the tray table 112 as it moves from a retracted configuration 124 to a deployed configuration 126. In some examples, the tray table support element 122 includes one or more telescoping support arm(s) 128 supporting the tray table as the tray table is deployed. In some examples, the tray table is suspended over the lap of a user in the fully deployed position.

The modular tray table apparatus 100 in some examples includes a linear displacement mechanism 130 disposed between an underside (bottom member) of the tray table 112 and the tray table support element 122. The tray table 112 slides along a linear displacement path 132 between the fully retracted configuration 124 when the tray table 112 is stowed within the console 104 and an at least partially deployed configuration 126 when the tray table is deploying out of the tray table housing in the console, such as deployment for use by a passenger.

In some examples, the linear displacement mechanism 130 includes a set of rails associated with the tray support element 122. In other examples, the linear displacement mechanism 130 includes a set of one or more guides and guiding elements for guiding linear movement of the tray table.

In other examples, a rotational displacement mechanism 134 is disposed between an underside (bottom member) of the tray table 112 and the tray table support element 122. The tray table 112 slides along a rotational displacement path 136 having a degree of rotation 138. In some examples, the degree of rotation is a ninety-degree arc of rotation. However, the examples are not limited to a ninety-degree arc of rotation. In other examples, the degree of rotation 138 is a forty-five-degree arc of rotation, a forty-five-degree arc of rotation, or any other suitable degree of rotation.

The rotational displacement path 136 in some examples is defined by at least one rotational guide between a linear configuration of the tray table and a substantially perpendicular configuration of the tray table. The rotational guide is a channel, groove, track, railing, depression, trough, or other guide to receive a corresponding guiding element. In this example, one or more guiding elements on the underside of the tray table slides through the rotational guide(s) to direct the tray table along the rotational displacement path 136 as the tray table is rotated from the linear configuration into a substantially perpendicular configuration for utilization by a passenger.

In some examples, a stowing motion of the tray table support element 122 and a stowing motion of the tray table 112 are coupled in a combined motion or forced motion. For example, initiating stowing of the tray table 112, such as by pushing or pressing against the tray table, may cause the tray table support element 122 to move partially from the deployed configuration 126 in a direction towards the retracted configuration 124. For example, initiating stowing of the tray table support element 122, such as by pushing or pressing against the table support element, may cause the tray table 112 to move partially from the in-use (fully deployed) position in a direction towards the stowed position. In the stowed position, a longitudinal extension axis of the tray table 112 is arranged parallel to a longitudinal extension axis of the tray table support element 122.

In other examples, a movement of the tray table 112 between the stowed position and the in-use position comprises a linear displacement and the rotational displacement relative to the longitudinal extension axis of the tray table support element. The rotational displacement of the tray table, such as a table leaf, with respect to the table support element is carried out about a virtual pivot, such that the tray table 112 avoids undesirable contact with other elements, e.g., other furniture structures, such as, but not limited to, console 104 structures, back shell and seat dividing structures during displacement between the fully deployed (in-use) position and the stowed position. The linear displacement and the rotational displacement are configured such that the tray table carries out a predefined motion along a virtual line about the virtual pivot, whereas the tray table 112 does not protrude the virtual line. Further, it is possible to easily stow the tray table 112 at any point within the linear displacement range.

Common table elements, in other examples, are pivotable about one pivot point provided at a fixed location. The combination of the linear displacement and the rotational displacement allows a smooth and an easy-to-handle adjustment of the tray table 112. Further, the tray table 112 and the table support arm are both dependently or independently enabled to be pushed away for egress from a seat without fully stowing and clearing a table surface.

In another example, the tray table support element 122 includes a rear end coupled to the carrier unit 114 and a front end pointing away from the carrier unit 114. The tray table 112 includes at least first and second lateral sides defining a tabletop between them. In the stowed position of the tray table 112, the first lateral side is positioned in an area of the rear end and the second lateral side is positioned in an area of the front end of the tray table support element 122. In the use (fully deployed) position of the tray table 112, the first lateral side is positioned in the area of the front end and the second lateral side is positioned rotated away from the front end about a predefined angle. For example, when the tray table 112 is positioned in the stowed position, the first lateral side is positioned substantially perpendicular to the longitudinal extension axis of the table support element. When the tray table 112 is positioned in the use position, the first lateral side is positioned substantially parallel to the longitudinal extension axis.

Figure 2:
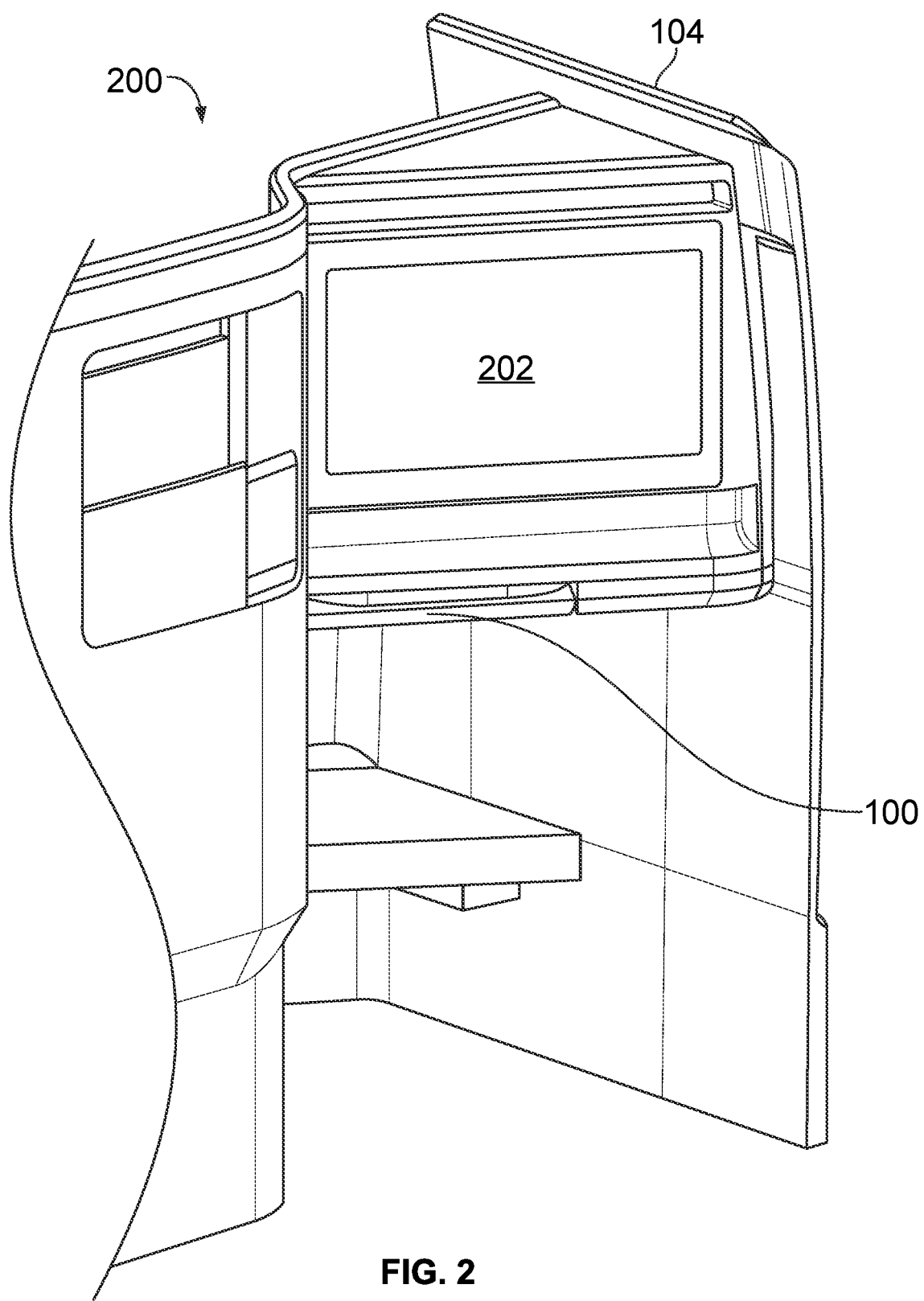
FIG. 2 is an exemplary schematic diagram illustrating a perspective view of a tray table retracted within a tray table housing associated with a console of a seat unit.

FIG. 2 is an exemplary schematic diagram illustrating a perspective view of a tray table retracted within a tray table housing associated with a console 200 of a seat unit, such as, but not limited to, the seat unit 106 in FIG. 1. The console 200 is a console associated with the seat unit, such as, but not limited to, the console 104 in FIG. 1.

The console 200 may be part of a furniture structure to create privacy for a passenger in a vehicle cabin. For example, the console 200 or any other structural component of a vehicle cabin may provide an open space in which the tray table apparatus is easily insertable and attachable thereto.

The tray table apparatus, in this example, is shown in a mounted and fully stowed state within a triangular-shaped portion of the console 200. However, the console 200 is not limited to the size, shape, dimensions, or design of the console shown in FIG. 3. The modular tray table apparatus 100 may be installed in a variety of different types and sizes of consoles associated with a passenger seat unit.

In some example, the modular tray table apparatus 100 sits within a slot or other tray mounting space associated with the console. In this non-limiting example, the modular tray table apparatus 100 is mounted below a portion 202 of the console 200. The tray table (not shown) is not visible in this example as the tray table is in a fully stowed position within the modular tray table apparatus 100.

In this example, the modular tray table is installed such that the tray table deploys at or near the approximate level of the waist height or chest height of a seated passenger for convenient utilization during eating and/or drinking. However, the examples are not limited to installation of the modular tray table apparatus at the position and/or height shown in FIG. 2. In other examples, the tray table may be installed at any position or height within the console 200 for convenient utilization of the user.

Figure 3:
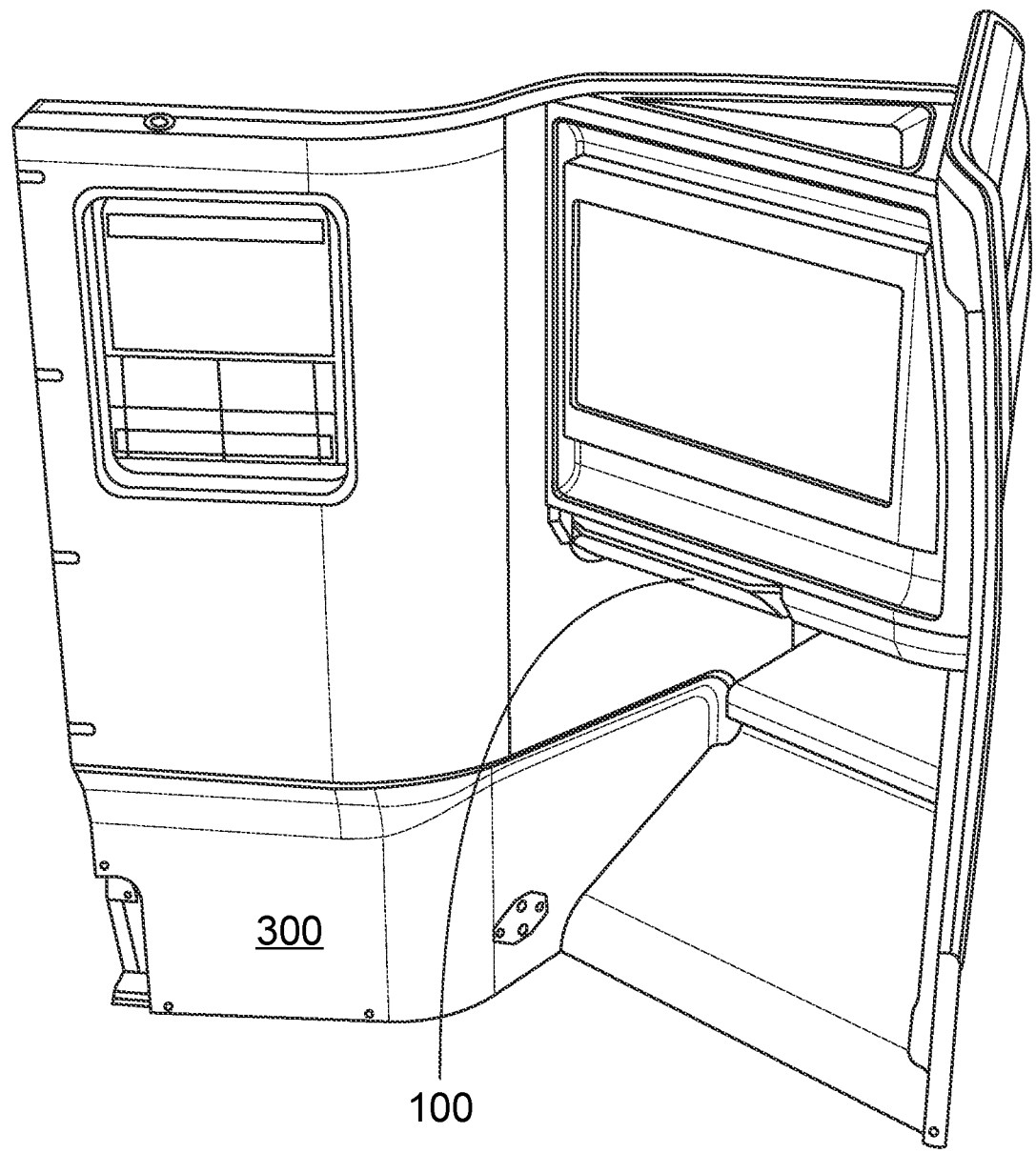
FIG. 3 is an exemplary schematic diagram illustrating a perspective view of a fully stowed tray table within a console of a seat unit.

FIG. 3 is an exemplary schematic diagram illustrating a perspective view of a fully stowed tray table within a console 300 of a seat unit. The console 300 is a console associated with a passenger seat unit, such as, but not limited to, the console 104 in FIG. 1. The console 300 is not limited to the size, shape, dimensions, or design of the console shown in FIG. 3. The modular tray table apparatus 100 may be installed in a variety of different types and sizes of consoles associated with a passenger seat unit.

Figure 4:
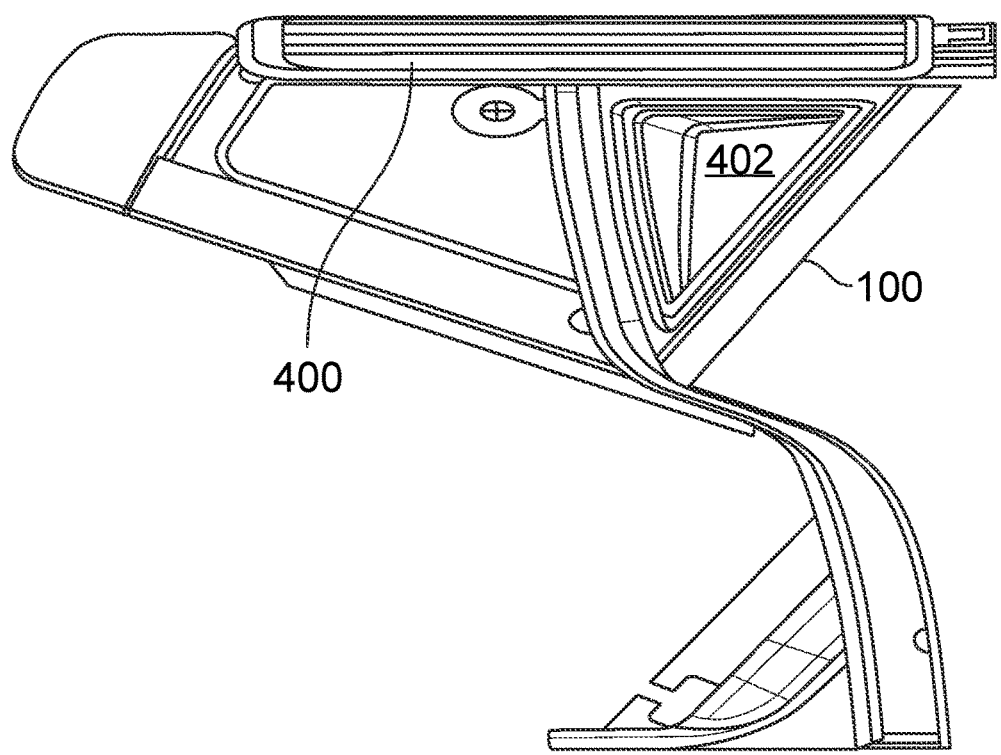
FIG. 4 is an exemplary schematic diagram illustrating a top view of a fully stowed tray table within a console associated with a seat unit.

FIG. 4 is an exemplary schematic diagram illustrating a top view of a fully stowed tray table within a console 400 associated with a seat unit. In this example, the modular tray table apparatus 100 is fully stowed within the tray mounting slot, such as, but not limited to, the slot 120 in FIG. 1. In this example, the modular tray table is mounted beneath a triangular-shaped portion 402 of the console 400. However, the examples are not limited to installation of the modular tray table apparatus within or beneath a triangular-shaped portion of the console. In other examples, the modular tray table apparatus 100 is installed beneath or within a rectangular-shaped portion of a console, a rounded portion of a console, a square-shaped portion of a console, an irregularly shaped portion of a console, or any other size or shape of a console having a slot sized to accommodate the modular tray table apparatus.

Figure 5:
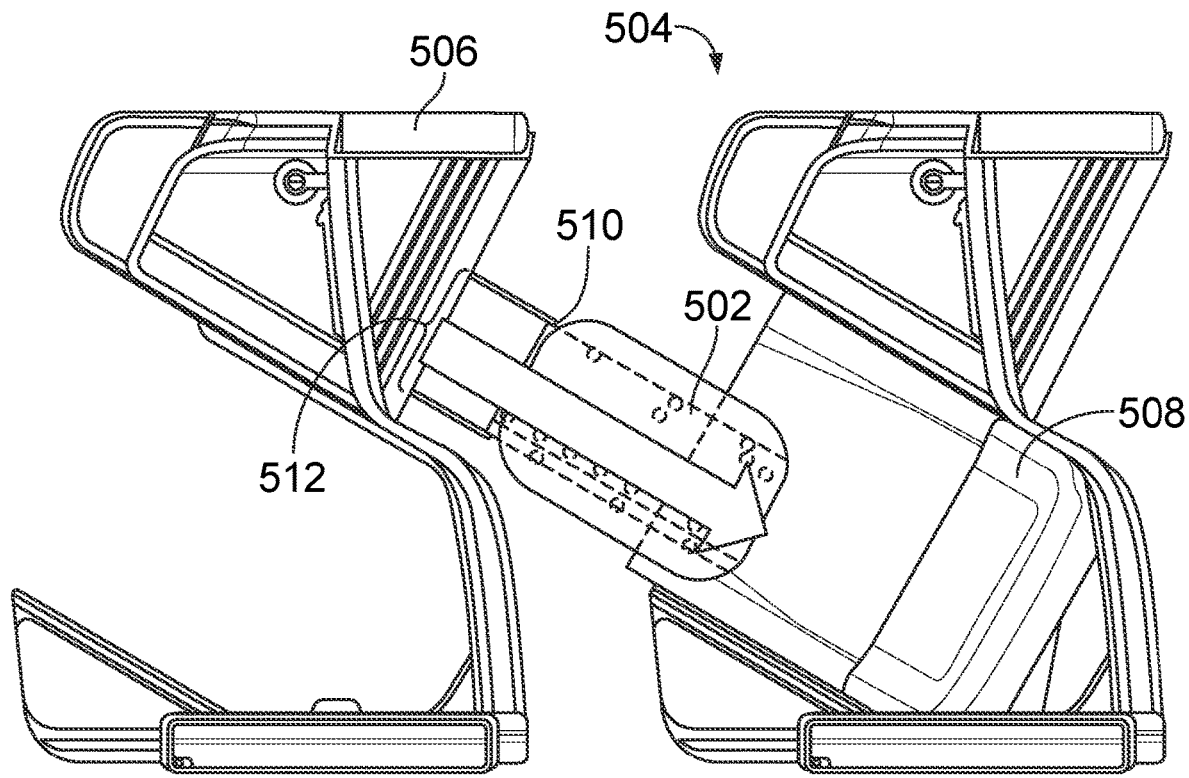
FIG. 5 is an exemplary schematic diagram illustrating a top view of a partially deployed tray table deploying from a tray table housing of a seat unit console.

FIG. 5 is an exemplary schematic diagram illustrating a top view of a partially deployed tray table 502 deploying from a tray table housing of a seat unit 504 console 506. The seat unit 504 is a seat assembly including a seat 508 and the console 506 with a tray table 502, such as, but not limited to, the seat unit 106 in FIG. 1. The modular tray table apparatus includes a carrier unit (not shown) which is mounted to the console 506.

The tray table 502 includes a tray table support element 512 mounted to the carrier unit and which is movable between a retracted position and a deployed position. The tray table support element in this example includes a set of telescoping rails 510. In this example, the telescoping rails 510 are uncovered such that a pass-through space is visible. In other examples, the rails are covered by a cover, such as, but not limited to, the cover 610 in FIG. 6 below.

The tray table is movably supported on the table support element rails 510 between at least a stowed position and a partially deployed position of the tray table support element. In other words, the tray table support element is in a deployed or partially deployed position in which the tray table is outside the tray mounting device slot inside the console. The tray table is arranged in the stowed position (linear orientation).

Figure 6:
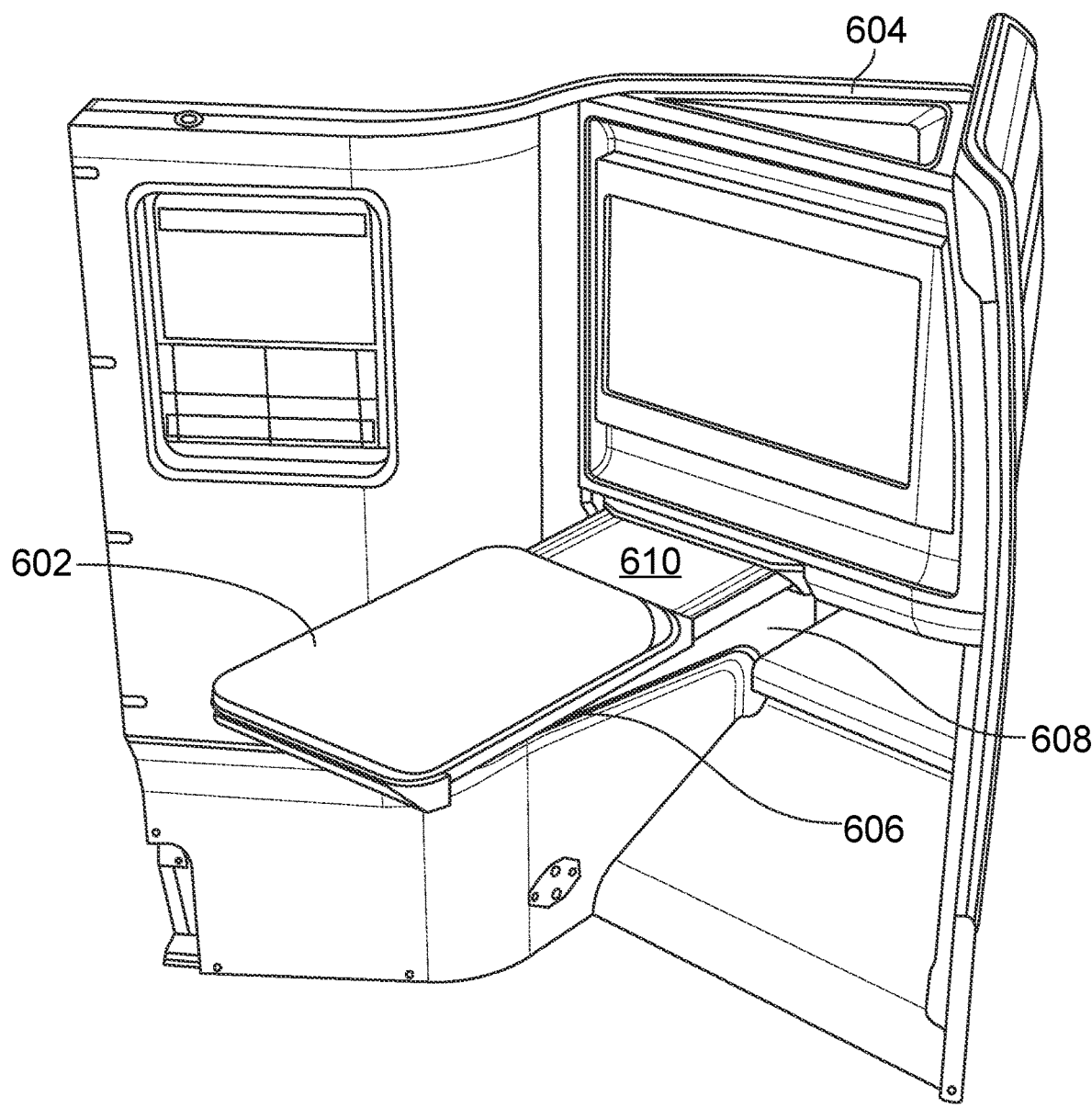
FIG. 6 is an exemplary schematic diagram illustrating a perspective view of a partially deployed tray table deploying from a portion of a console.

FIG. 6 is an exemplary schematic diagram illustrating a perspective view of a partially deployed tray table 602 deploying from a portion of a console 604. The tray table is a table member providing a top surface for use by a passenger or other user while eating, drinking, reading or other activities. The tray table 602 is a tray table such as, but not limited to, the tray table 112 in FIG. 1. The console 604 is a furniture member associated with a seat unit, such as, but not limited to, the console 104 in FIG. 1.

In this example, the tray table 602 is partially deployed along a linear displacement path. A carrier unit 608 attached to a support arm 606 is mounted to at least a portion of the console. In some examples, the carrier unit 608 is mounted to a housing which is mounted to a tray mounting device on the console, such as, but not limited to, the tray mounting device 116 in FIG. 1. In other examples, the carrier unit 608 itself is directly mounted to the tray mounting device.

The support arm 606 is a telescoping arm having a cover 610 such that there is no pass-through space between the sides or rails of the telescoping support arm 606. However, in other examples, the support arm may be implemented as a set of one or more rails without the cover 610.

The cover 610 in this example covers the support arm to improve an appearance of the tray table support arm 606 but does not function to provide additional support to the tray table. The tray table is supported by one or more support arms, including the support arm 606. However, in other non-limiting examples, the cover may provide additional support structure and/or stability to the tray table 602.

The tray table 602 in this example is in a linear (stowed) orientation such that the tray is in position or orientation to be returned into the tray table housing or tray table slot of the tray mounting device within the console, if desired by the user. The tray table 602 can be rotated along a rotational displacement path to re-orient the tray table 602 into a substantially perpendicular position for utilization by a passenger during eating, drinking, reading or other tray table use.

Figure 7:
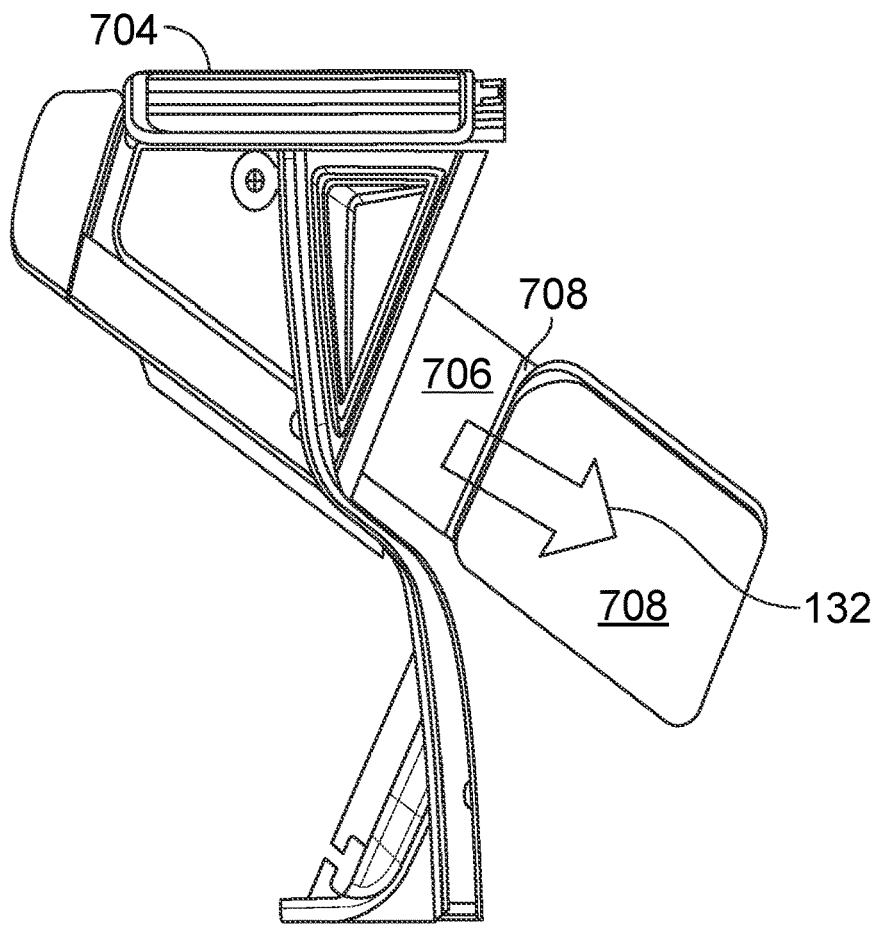
FIG. 7 is an exemplary schematic diagram illustrating a top view of a partially deploying tray table moving along a linear displacement path.

FIG. 7 is an exemplary schematic diagram illustrating a top view of a partially deploying tray table 702 moving along a linear displacement path 132 as the tray table is being deployed out of the tray mounting device in the console 704 and into a partially deployed or fully deployed position for use by a passenger or other user. In this non-limiting example, a first support arm 706 and cover of the tray table support element is at least part visible during the tray deployment. A second support arm 708 attached to the first support arm 706 and the tray table 702 is partially visible as well, although a majority of the second support arm 708 is obstructed by the tray table which is attached to the second support arm 708. The first support arm and the second support arm are part of the tray table support element. The tray table support element in this example includes two support arms, the support arm 706 and the support arm 708. In other examples, the tray table support element can include a single support arm, as well as three or more support arms. The support arms can be telescoping support arms and/or segmented and nested support arms which are extendable out of the tray mounting device slot to reduce a distance between the user sitting in the corresponding seat unit and the tray table 708 when fully deployed.

In some examples, the support arm(s) extend during linear deployment a distance or length of approximately twenty-four and a half (24.5) inches. However, the examples are not limited to an extension of the tray table of twenty-four and a half inches. In other examples, the tray table is deployed along a linear distance or length of twenty inches, fifteen inches, twenty-five inches or any other suitable distance to enable a user sitting in a corresponding passenger seat to conveniently reach the tray table for utilization during meals, enjoying snacks, and/or other activities.

Figure 8:
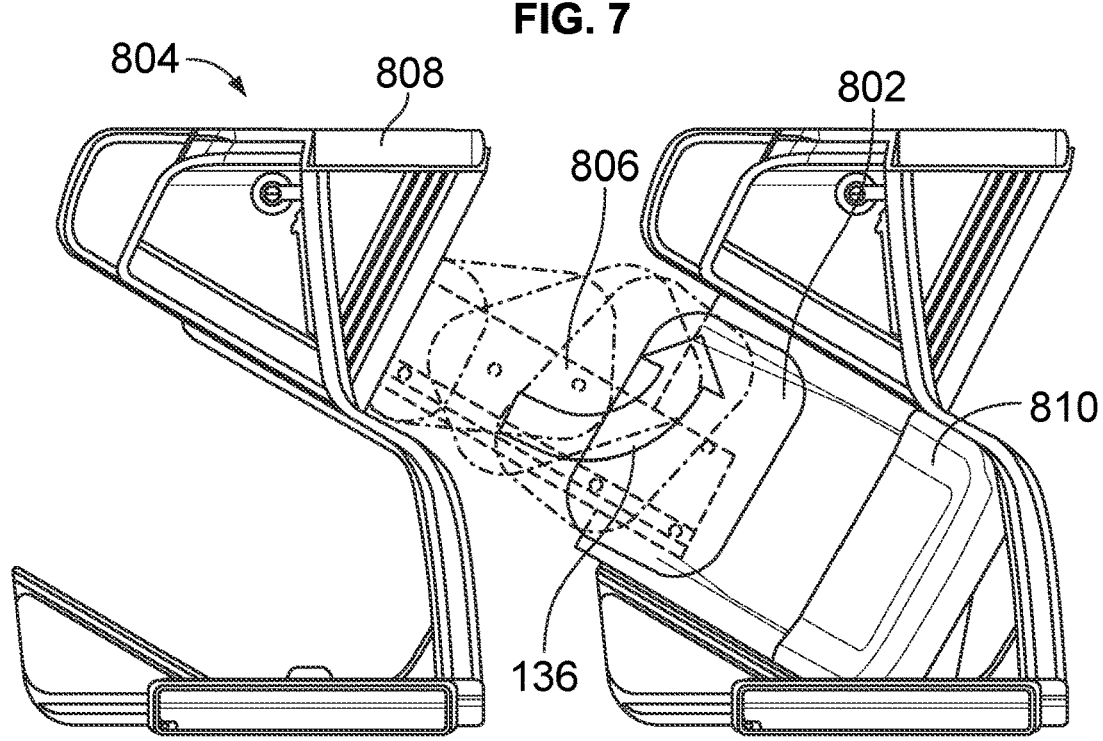
FIG. 8 is an exemplary schematic diagram illustrating a top view of a tray table associated with a seat unit moving along a rotational displacement path between a linear orientation and a perpendicular orientation.

FIG. 8 is an exemplary schematic diagram illustrating a top view of a tray table 802 associated with a seat unit 804 moving along a rotational displacement path 136 between a linear orientation and a perpendicular orientation. In this example, FIG. 8 shows a displacement motion of the tray table 802. The tray table is a stowable tray table of a modular tray table apparatus, such as, but not limited to, the tray table 112 in FIG. 1.

In some examples, the tray table 802 is configured to carry out a rotational displacement along a rotational displacement path 136 between the stowed position and the in-use position during movement of the tray table support element between the retracted position and the deployed position. The tray table 802 is moved from the in-use (perpendicular orientation) position to the stowed (parallel orientation) position during movement of the tray table support element 806 from the deployed position to the retracted position.

Further, an appearance of a deployment motion from the stowed position to the use position of the tray table 802 during a deployment motion of the tray table support element, such as when the tray table is initially pulled out from the console 808, is improved when the tray table 802 turns with the deployment of the tray table support element 806 towards the seat 810. The console 808 is a furniture piece associated with the seat unit 804, such as, but not limited to, the console 104 in FIG. 1.

Figure 9:
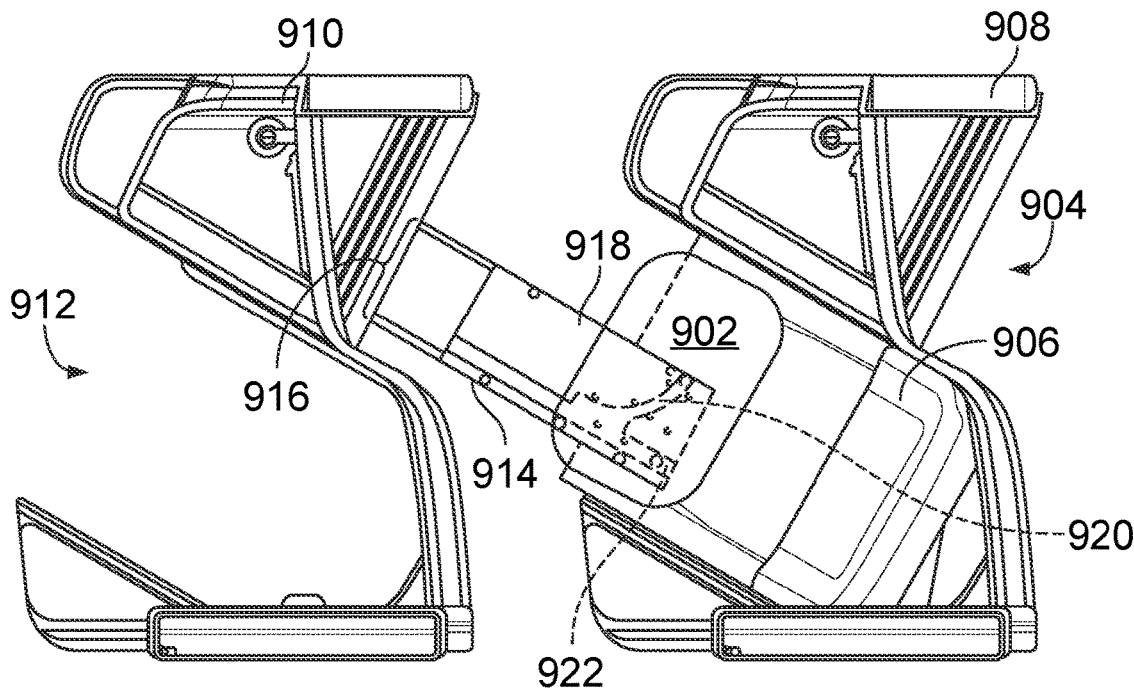
FIG. 9 is an exemplary schematic diagram illustrating a top view of a tray table in a fully deployed configuration and rotated into a perpendicular orientation for use by a passenger associated with a seat unit.

FIG. 9 is an exemplary schematic diagram illustrating a top view of a tray table 902 in a fully deployed configuration and rotated into a perpendicular orientation for use by a passenger associated with a seat unit 904. The tray table 902 is a tray table of a modular tray table apparatus, such as, but not limited to, the tray table 112 in FIG. 1. The seat unit 904 is a seating apparatus including a passenger seat 906 and/or a console 908, such as, but not limited to, the seat unit 106 in FIG. 1. The tray table 902 associated with the seat 906 is installed into a console 910 associated with a next seat unit 912 situated in front of the seat 906.

In this example, the tray table support element 914 is in the deployed position and the tray table 902 is arranged in the in-use position, where the tray table is rotated about a predefined angle. In this example, the predefined angle is ninety degrees (90°) in which the tray table is substantially perpendicular to the tray table support element 914. However, the examples are not limited to a ninety-degree rotation of the tray table. In other examples, the predefined angle is ninety-five degrees, forty-five degrees, or any other predefined degree of rotation to place the tray into position for use by a passenger seated in the seat 906.

The tray table support element is moved back in a direction towards the carrier structure attached to the tray mounting device within a slot of the console 910 to provide egress and ingress space into the seat 906 and/or away from the seat 906.

The tray table support element 914 in this example includes a set of rails 916 without a cover, as well as at least one covered support arm 918. A rotational (curved) guide 920 within the tray table support element 914 guides rotation of the tray table 902 along the arc of rotation from the linear orientation into the substantially perpendicular orientation. A linear guide 922 within the tray table support element 914 guides linear movement of the tray table along a linear displacement path from the fully deployed configuration to the fully retracted configuration.

Figure 10:
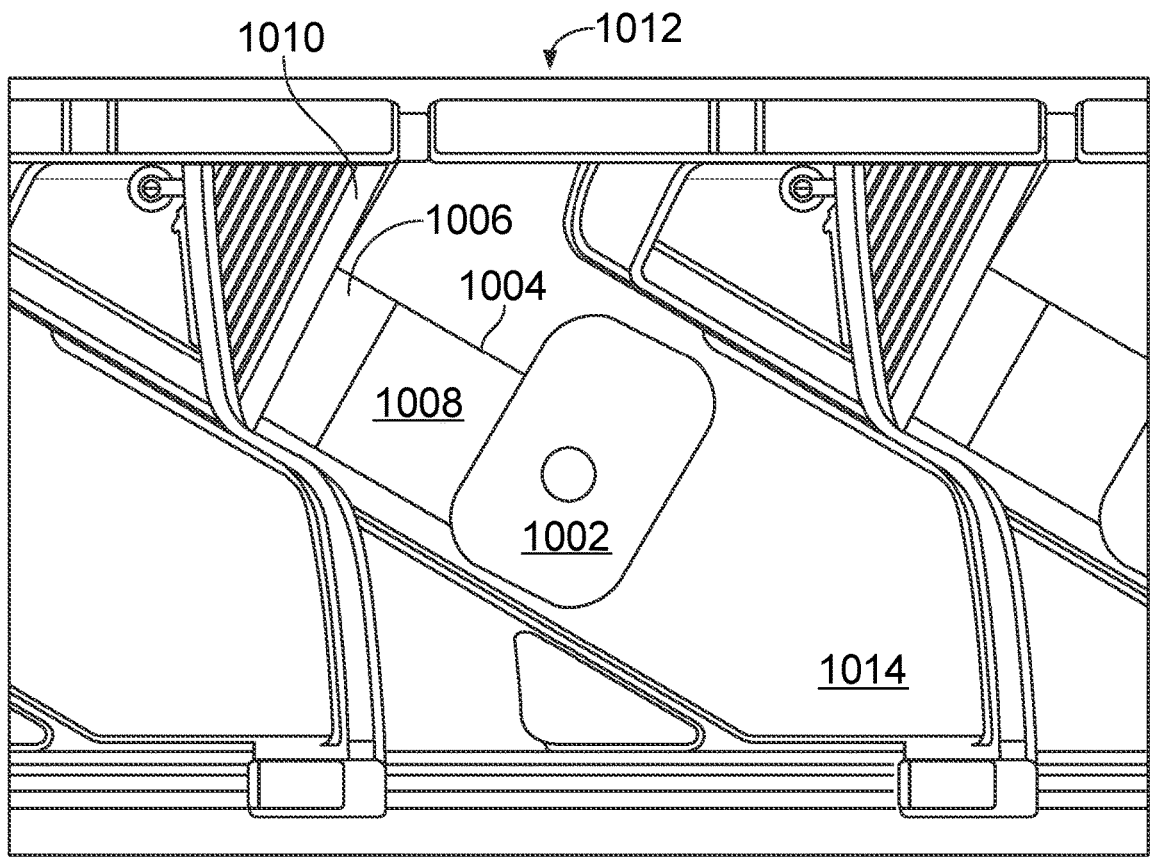
FIG. 10 is an exemplary schematic diagram illustrating a top view of a fully deployed tray table in a perpendicular orientation ready for use.

FIG. 10 is an exemplary schematic diagram illustrating a top view of a fully deployed tray table 1002 in a perpendicular orientation ready for use. The tray table 1002 is a tray table associated with a modular tray table apparatus, such as, but not limited to, the tray table 112 in FIG. 1.

The tray table support element 1004, in this example, in the deployed position and the tray table 1002 is arranged in the in-use (rotated) position. The tray table support element 1004 includes an upper support arm 1006 connected to the carrier unit (not shown) and the lower support arm 1008. The upper support arm and the lower support arm are adjustable relatively to one another and to the carrier unit.

The tray table support element 1004 is movably coupled to the carrier unit in a linear displaceable manner. The linear displacement direction moving away from the console and toward the console 1010 in along the linear displacement path. The console 1010 is a console associated with a seat unit 1012 having a seat 1014, such as, but not limited to, the console 104 in FIG. 1.

In this example, the tray table support element 1004 includes an adjustable telescopic mechanism. The upper support arm 1006 and the lower support arm 1008 are adjustable relatively to each other in a manner of a telescopic mechanism, e.g., by a rails, tracks, or any other sliding mechanism.

The tray table 1002, in some examples, has the second lateral side positioned (rotated) away from the front end at about an angle of 90° when the table is in-use by a passenger. In other examples, the tray table 1002 is coupled to the tray table support element 1004 via at least one linear displacement mechanism provided between the tray table 1002 and the table support element 1004. The linear displacement mechanism is configured to guide the tray table 1002 along the longitudinal extension axis of the table support element. The linear displacement mechanism comprises at least a linear guide and a corresponding guiding element movably arranged in the linear guide. The linear guide is provided on either the table support element or the tray table 1002 The guiding element is provided on either the table support element or the tray table 1002.

Figure 11:
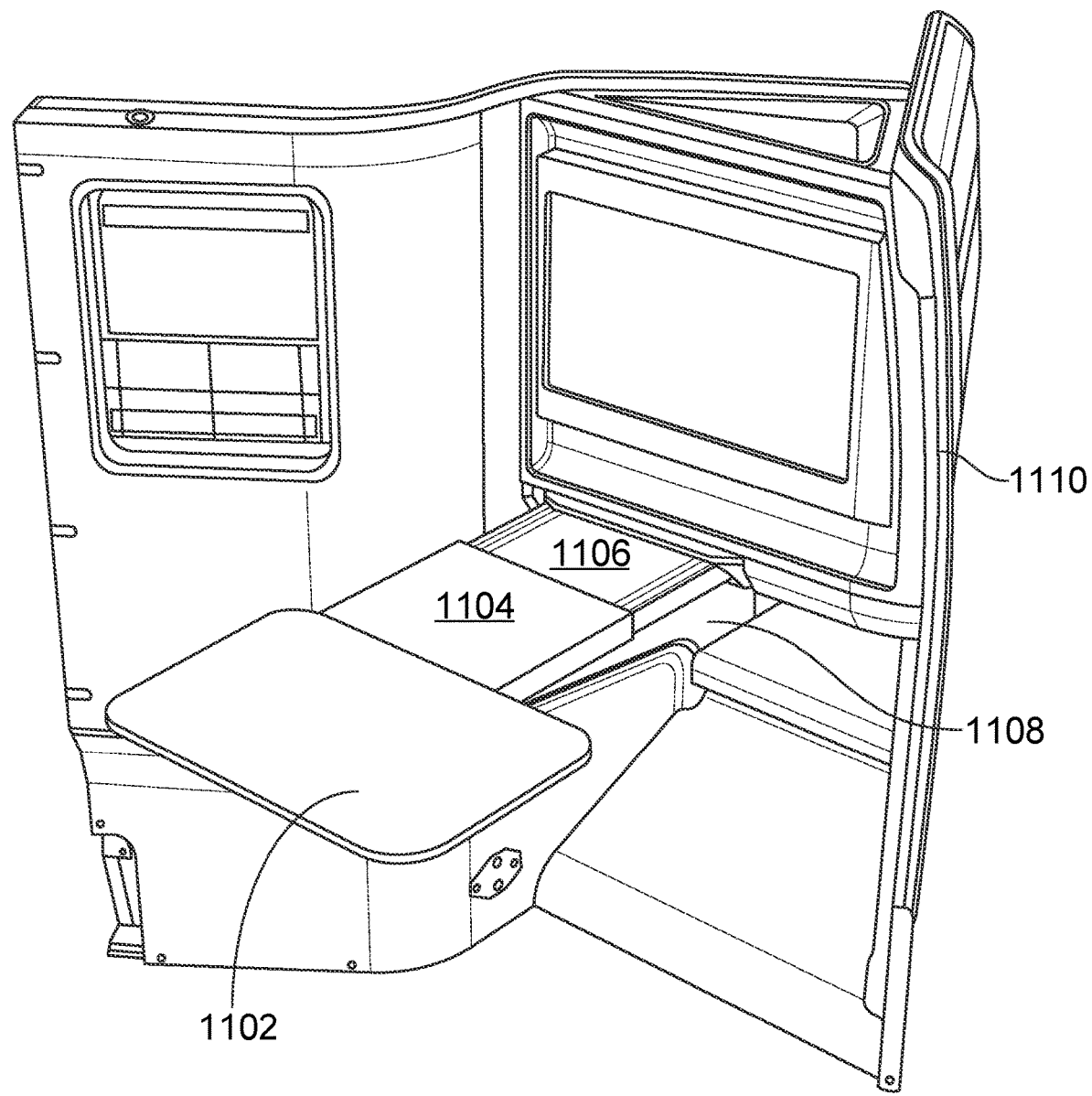
FIG. 11 is an exemplary schematic diagram illustrating a front perspective view of a fully deployed tray table.

FIG. 11 is an exemplary schematic diagram illustrating a front perspective view of a fully deployed tray table 1102. In this non-limiting example, the tray table 1102 is in a fully deployed position at the maximum linear displacement and fully rotated at the maximum rotation of the tray table into an in-use position ready for utilization by a passenger. The tray table is coupled to a support arm 1104. The tray table 1102 sits on top of at least a portion of the support arm. In other words, at least a portion of the support arm 1104 sits beneath at least a portion of the tray table 1102, supporting the tray table.

The support arm 1104 is connected to another support arm 1106. The second support arm is connected to a carrier unit 1108 which is mounted to the console 1110. The console 1110 is a console such as, but not limited to, the console 104 in FIG. 1.

Figure 12:
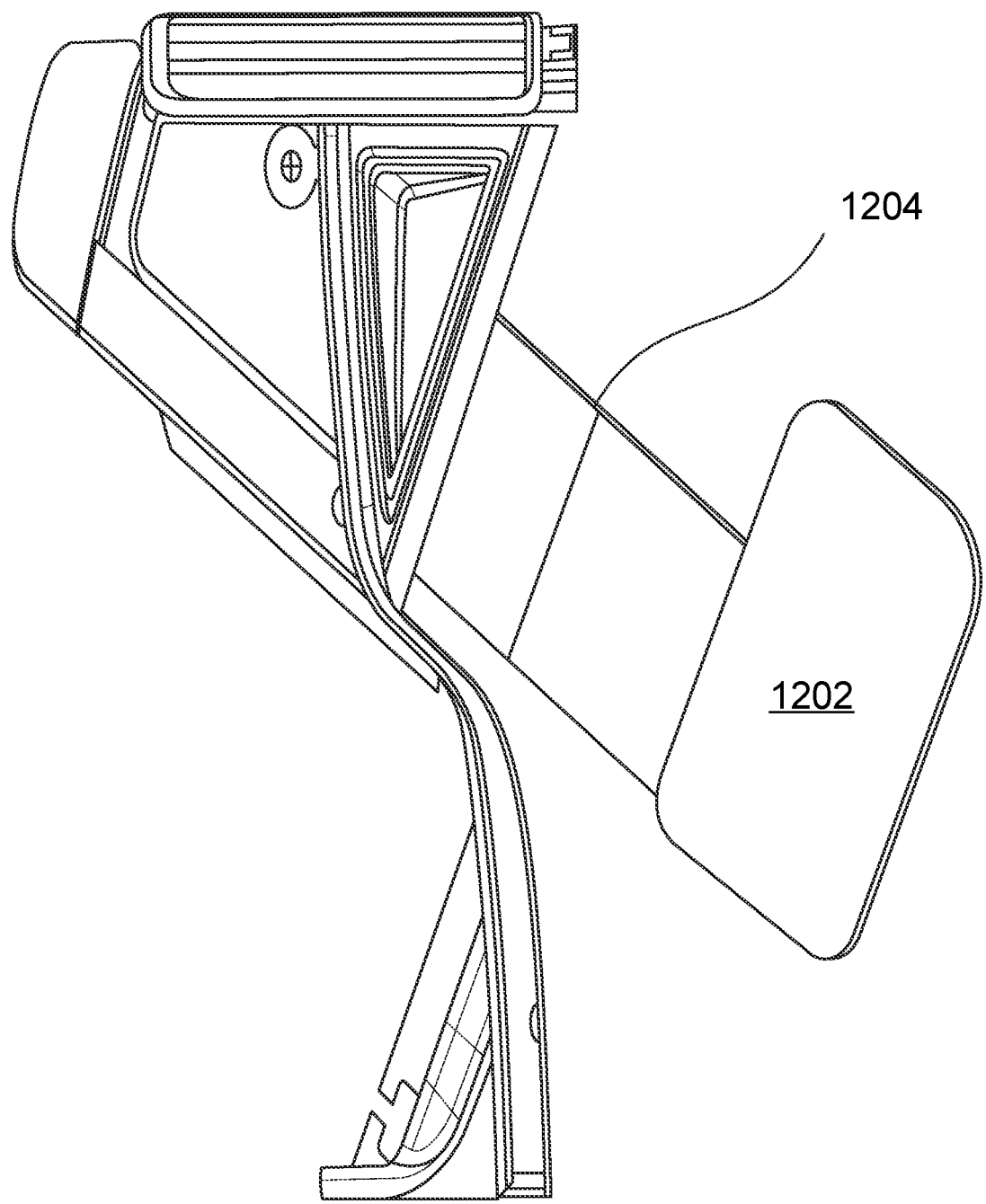
FIG. 12 is an exemplary schematic diagram illustrating a top view of the fully deployed tray table in a fully rotated orientation.

FIG. 12 is an exemplary schematic diagram illustrating a top view of the fully deployed tray table 1202 in a fully rotated orientation. In this example, the tray table is fully extended along the linear displacement path. The tray table is fully rotated into an in-use position in which the tray table is in a substantially perpendicular orientation relative to the tray table support element 1204.

Figure 13:
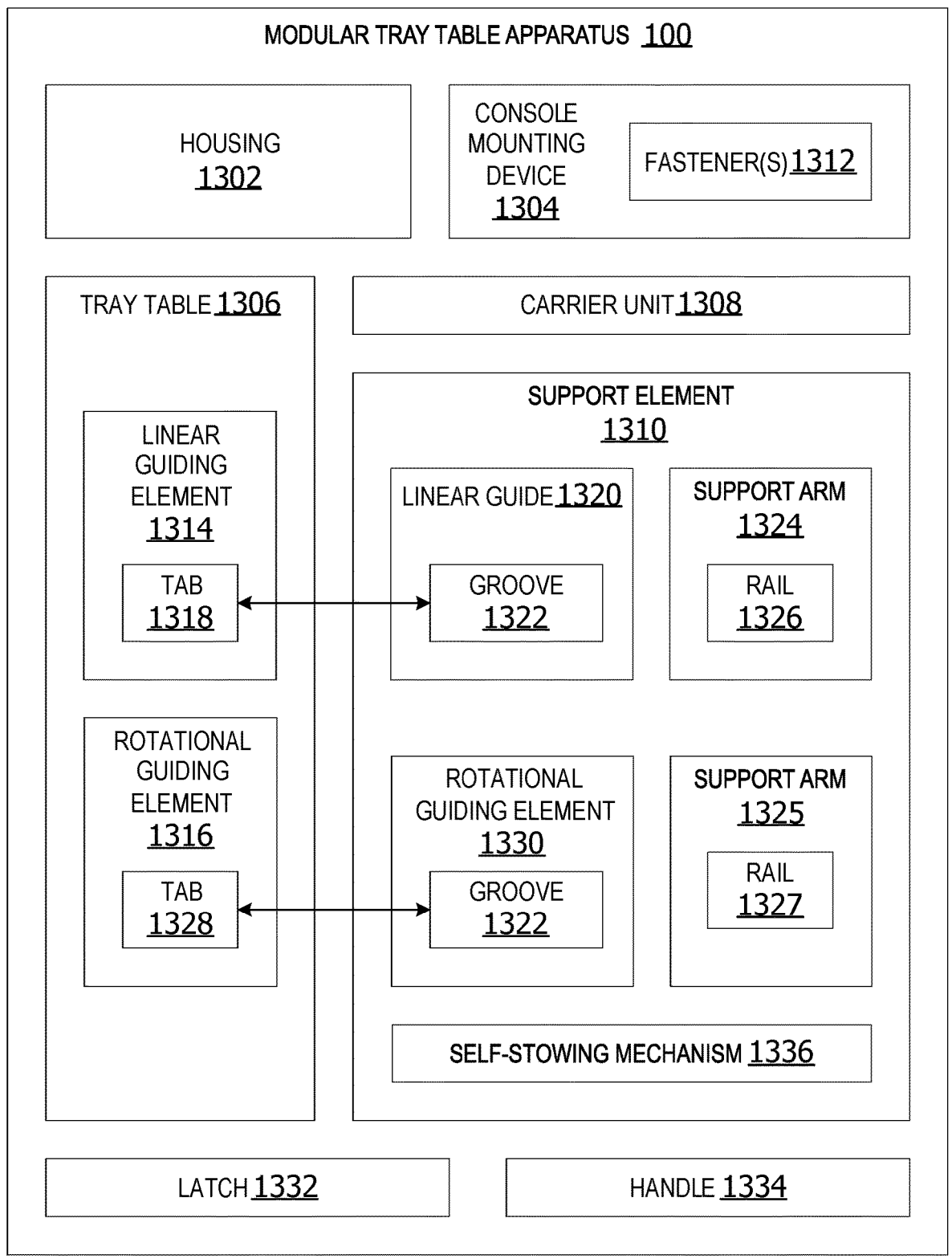
FIG. 13 is an exemplary block diagram illustrating a modular tray table apparatus.

FIG. 13 is an exemplary block diagram illustrating a modular tray table apparatus 100. In some examples, the modular tray table apparatus 100 is includes a housing 1302 fully enclosing or at least partially enclosing one or more of the components of the modular tray table apparatus 100, such as, but not limited to, the console mounting device 1304, the tray table 1306, carrier unit 1308 and/or the tray table support element 1310. In other non-limiting examples, the modular tray table apparatus 100 does not include the housing. In these cases, the console mounting device 1304 mounts directly to a tray mounting device of the console without a housing partially enclosing the modular tray table apparatus 100.

The console mounting device 1304 is a device for removably mounting the modular tray table apparatus 100 to the console. In some examples, the console mounting device 1304 includes a set of one or more fasteners 1312 for fastening the modular tray table apparatus 100 to the tray mounting device within a slot or other open space inside the console. In one example, the fastener(s) 1312 are secured through one or more fastener holes or slots in the tray mounting device to removably attach the modular tray table apparatus 100 to the console.

The tray table 1306 is a tray table such as, but not limited to, the tray table 112 in FIG. 1. The tray table 1306 includes a linear guiding element 1314 and/or a rotational guiding element 1316. The linear guiding element 1314 is a device for guiding motion of the tray table along the linear displacement path. The linear guiding element 1314 can include a tab 1318 disposed within a linear guide 1320 of the support element 1310. The tab 1318 is a tab, pin, peg, or other element which fits inside the linear guide 1320 of the support element 1310.

The linear guide 1320 in some examples is a groove 1322. The groove 1322 is a linear groove, path, channel, indentation, or other channel through which the tab 1318 slides. In other examples, the linear guide 1320 is implemented as a set of rails or support arms, such as the support arm 1324 and/or rail 1326 of the support element 1310. In these examples, the linear guiding element 1314 slides along the support arm or rail 1326 along the linear displacement path.

A rotational guiding element 1316 is an element associated with the tray table 1306. In some examples, the guiding element 1316 is a tab 1328 attached to an underside of the tray table 1306. The tab 1328 can be implemented as a peg, tab, pin, roller, or any other element which fits inside the rotational guiding element 1330 and slides or moves along the rotational displacement path defined by the rotational guiding element 1330. In some examples, the rotational guiding element 1330 is a groove 1322 in the support arm 1324 attached to the underside of the tray table 1306. The groove 1322 is a groove, path, channel, indentation, or other channel through which the tab 1328 slides or moves.

In some examples, the support arm 1324 attaches to another support arm 1325. The support arm 1324 either attaches to another support arm or attaches to the carrier unit 1308. The support arm 1325 is implemented as one or more rails. The one or more rail(s), such as the rail 1327, is optionally covered by a cover member which covers an open space one or more sides of a single rail. The cover optionally covers a pass-through space between two or more rails.

A latch 1332 optionally secures the modular tray table apparatus 100 inside the console when the modular tray table apparatus 100 is in the fully stowed (retracted) configuration. The latch is decoupled or released when a user pulls or otherwise activates a handle 1334 on the modular tray table apparatus 100 to deploy or partially deploy the tray table 1306.

In one example, the tray table 1306 is coupled to the tray table support element 1310 via at least one rotational displacement mechanism provided between the tray table 1306 and the tray table support element 1310. The rotational displacement mechanism is configured to guide the tray table 1306 in rotational manner with respect to the table support element 1310. The rotational displacement mechanism, in some examples, includes at least a curved rotational guide 1330 and a corresponding guiding element 1316 movably arranged in the curved rotational guide 1330. In this example, the curved guide is provided on the support element 1310. In other examples, the rotational guide 1330 is provided on the tray table and the rotational guiding element 1316 is provided on the support arm 1324 of the support element. Thus, the rotational guide 1330 is provided either on the tray table support element or the tray table itself. Likewise, the rotational guiding element 1316 is provided either on the table support element 1310 or the tray table 1306.

In other examples, the tray table support element 1310 includes at least a self-stowing mechanism 1336 which is configured to automatically move the tray table 1306 into the stowed (retracted) configuration when the tray table is at least partially moved back from the use position towards the stowed position.

In still other examples, the tray table support element 1310 is movably coupled to the carrier unit 1308 in a linear displaceable manner. The tray table support element 1310 includes an upper support arm 1324 and a lower support arm 1325 which are adjustable relatively to one another and to the carrier structure. For example, the table support element includes an adjustable telescopic mechanism, wherein the lower and upper support arms are adjustable relatively to each other in a manner of a telescopic mechanism.

The modular tray table apparatus 100 in other examples, is configured as a pre-assembled module. The modular tray table apparatus 100 is applicable to any console element, such as a passenger utility element. Further, the modular tray table apparatus 100 is substantially lightweight and comprises a compact built-in design. Moreover, any component of the modular tray table apparatus 100 is exchangeable in an easy manner. The table carrier unit 1308 is implemented in any shape and individually formed to fit to a console element. The tray table 1306 and the table support element 1310 are fully stowable within the housing 1302 such that the tray table and the table support element are protected against external influences, e.g., dust and dirt. Moreover, the appearance of the passenger area and the amount of passenger space available are increased.

Figure 14:
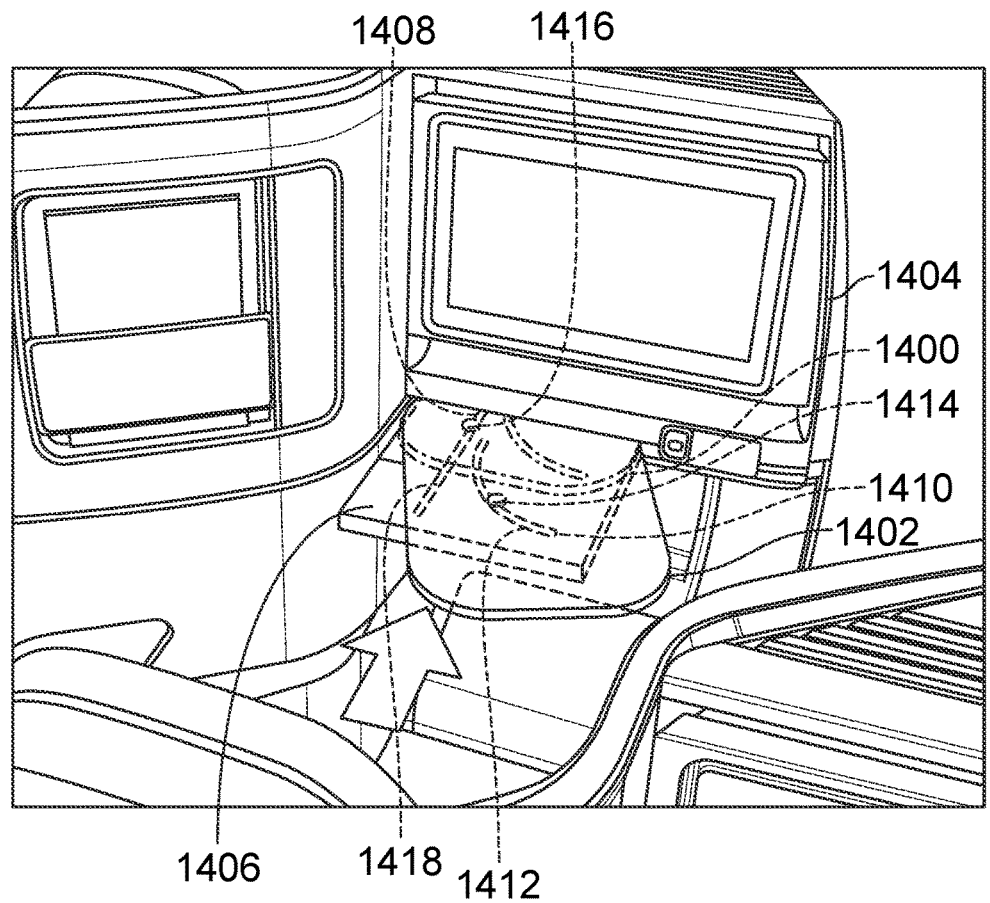
FIG. 14 is an exemplary schematic diagram illustrating a modular tray table apparatus having a displacement mechanism.

FIG. 14 is an exemplary schematic diagram illustrating a modular tray table apparatus 1400 having a displacement mechanism associated with the tray table 1402. In the example shown in FIG. 14, a displacement motion of the tray table 1402 is shown relative to the console 1404. For example, the table support element 1406 includes a self-stowing mechanism which is configured to automatically move the tray table into the stowed position when the tray table is at least partially moved back from the use position towards the stowed position to avoid damaging of the furniture structures and the table 1402.

The self-stowing mechanism is a mechanism such as, but not limited to, the self-stowing mechanism 1336 in FIG. 13 above. For example, the self-stowing mechanism may be realized by a spring device coupling at least one of the linear displacement mechanism 1408 and/or rotational displacement mechanism 1410 of the table support element 1406.

The tray table 1402 in this example is partially rotated along the rotational displacement path defined by the rotational guide 1412. A rotational guiding element 1414 slides through the rotational guide 1412 during the rotational movement of the tray table. The rotational guiding element 1414 is a peg, tab, ball, or other element, such as, but not limited to, the rotational guiding element 1316 in FIG. 13. The rotational guide 1412 is a channel or groove, such as, but not limited to, the rotational guide 1330 in FIG. 13.

Likewise, the tray table 1402 is partially deployed along the linear displacement path defined by the linear guide 1418. A linear guiding element 1416 slides, glides or otherwise moves along the linear guide 1418. The linear guide 1418 is a channel or groove, such as, but not limited to, the linear guide 1320 in FIG. 13. The linear guiding element 1416 is a guide such as, but not limited to, the linear guiding element 1314 in FIG. 13. In other examples, the linear displacement mechanism includes a set of rails or telescoping support arms for guiding the tray table along the linear displacement path.

Figure 15A:
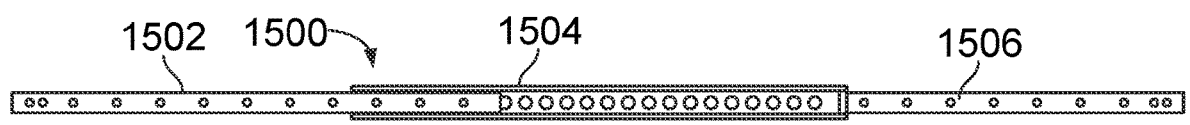
FIG. 15A is an exemplary schematic diagram illustrating a telescoping rail system in an extended configuration.

FIG. 15A is an exemplary schematic diagram illustrating a telescoping rail system 1500 in an extended configuration. In this example, a first support arm 1502, a second support arm 1504 and a third support arm 1506 are in a fully extended configuration. The support arm 1504 may be referred to as an upper support arm. The support arm 1506 may be referred to as a lower support arm.

The telescoping rail system 1500 in this example is a set of support arms associated with a tray table support element, such as, but not limited to, the tray table support element 122 in FIG. 1 and/or the tray table support element 1310 in FIG. 13. The telescoping rail system offers twenty-four and a half inches (24.5") of extension travel but is able to contract for stowing. The rail system meets abuse load requirements and cyclic test requirements at full extension.

Figure 15B:
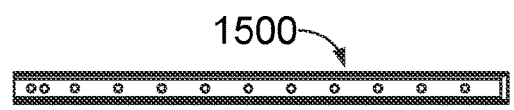
FIG. 15B is an exemplary schematic diagram illustrating the telescoping rail system in a closed configuration.

FIG. 15B is an exemplary schematic diagram illustrating the telescoping rail system 1500 in a closed configuration. The telescoping rail system is in a closed configuration while retracted (stowed) into the console while not in use. In the stowed (closed) configuration, the rail is able to stow within an eighteen-inch (18") space envelope (slot) within the console furniture. In one example, the un-extended slide to be packaged within the tray table assembly has a package size of twenty-six millimeters (26 mm) by twenty-eight millimeters (28 mm) by four hundred fifty-five millimeters (455 mm).

Figure 16:
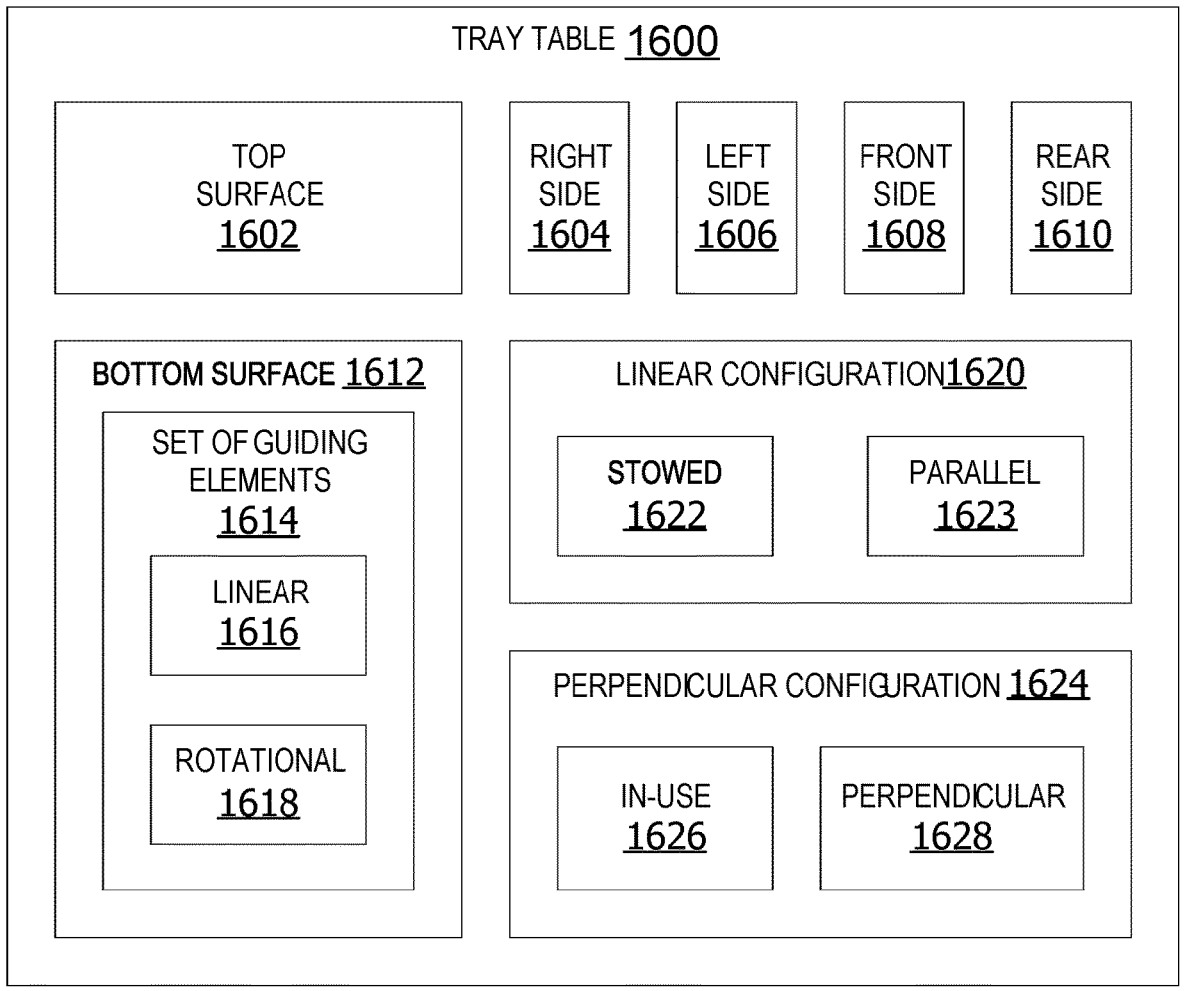
FIG. 16 is an exemplary block diagram illustrating a tray table associated with a modular tray table apparatus.

FIG. 16 is an exemplary block diagram illustrating a tray table 1600 associated with a modular tray table apparatus 100. The tray table 1600 is a tray table associated with a modular tray table apparatus, such as, but not limited to, the tray table 112 in FIG. 1 and/or the tray table 1306 in FIG. 13.

In some examples, the tray table 1600 includes a top (upper) surface 1602, a right side 1604, a left side 1606, a front side 1608, a rear side 1610 and/or a bottom (underside) surface 1612. The top surface 1602 is the surface utilized by a user when the tray table is in-use. The bottom surface 1612 of the tray table 1600 includes a set of guiding elements 1614, such as a linear 1616 guiding element and/or a rotational 1618 guiding element.

A linear configuration 1620 of the tray table 1600 is a configuration of the tray table in which the table is aligned or oriented (ready-to-be) stowed 1622. In other words, the tray table is substantially parallel 1623 with the support arm(s). In a rotated configuration 1624 the tray table is rotated to a position in which the tray table is ready for use by a passenger or already in-use 1626. In some examples, the tray table is substantially perpendicular 1628 to the support arm(s) while in the fully rotated configuration 1624. In a partially rotated configuration, the tray table is at an angle which is somewhere between the zero degree and ninety-degree orientation.

Figure 17:
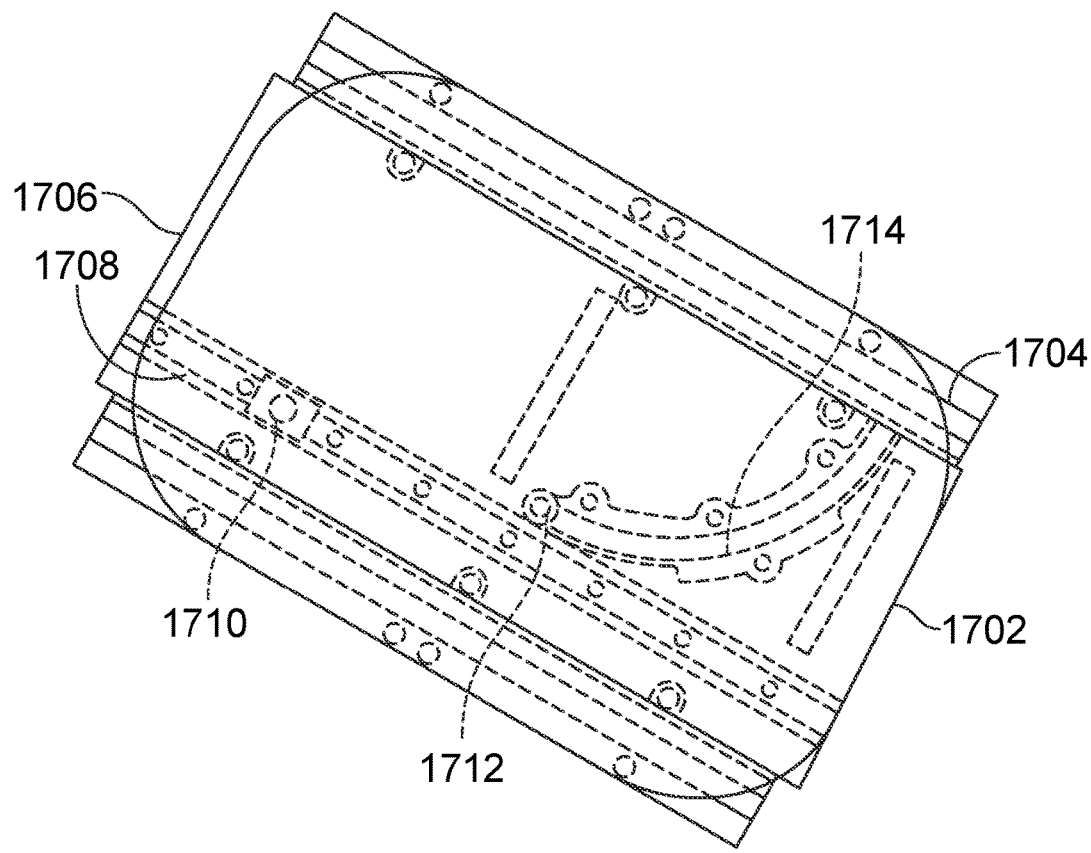
FIG. 17 is an exemplary schematic diagram illustrating a displacement mechanism disposed between a tray table and a support arm with the tray table in a linear configuration.

FIG. 17 is an exemplary schematic diagram illustrating a displacement mechanism 1704 disposed between a tray table 1702 and a support arm 1706 with the tray table 1702 in a linear configuration. The tray table 1702 is a table, such as, but not limited to, the tray table 112 in FIG. 1, the tray table 1306 in FIG. 13 and/or the tray table 1600 in FIG. 16.

A linear guide 1708 is provided on the support arm 1706. A linear guiding element 1710 of the tray table is disposed within the linear guide. The linear guiding element 1710 slides along the linear guide 1708 during linear movement of the tray table while the tray table is in a substantially parallel orientation to the support arm. In this example, the guiding element is only partially deployed along the linear displacement path. In this example, the linear guide 1708 is a track. The guiding element 1710 slides along the track during the linear movement.

A rotational guiding element 1712 on the tray table 1702 is disposed within the rotation guide 1714. The rotational guiding element 1712 slides along the rotational guide 1714 during rotational movement of the tray table when it rotates from the substantially parallel orientation to the substantially perpendicular orientation of the tray table. In this example, the tray table is not rotated and the rotational guiding element 1712 is disposed at a beginning point of the rotational guide.

In the example of FIG. 17, the tray table apparatus is shown with the retracted table support element and the tray table 1704 in the stowed position. For example, the linear guide 1708 of the linear displacement mechanism and the curved rotational guide 1714 of the rotational displacement mechanism are separate elements without a merging area. The predefined location of the guiding element 1710 of the rotational displacement mechanism is provided substantially in a center area of the tray table in view of its longitudinal extension range. The guiding element 712 of the linear displacement mechanism is provided substantially in a rear area of the tray table in view of its longitudinal extension range.

Figure 18:
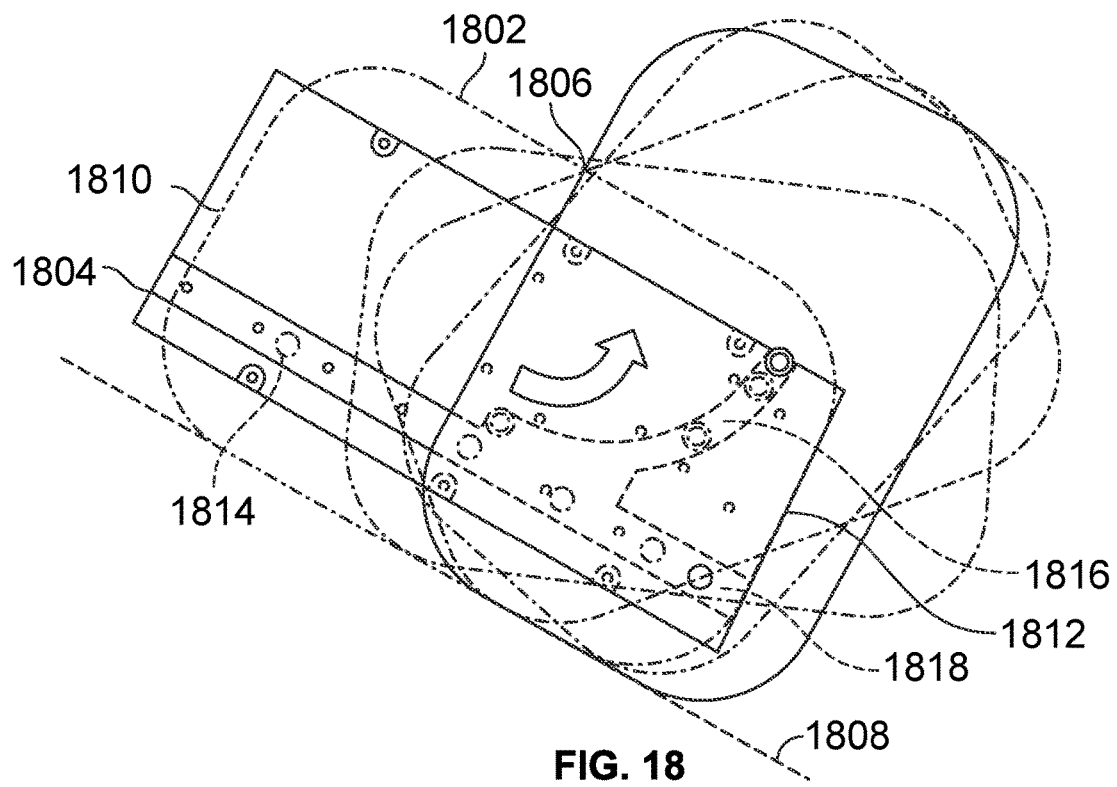
FIG. 18 is an exemplary schematic diagram illustrating a displacement mechanism disposed between a tray table and a support arm with the tray table in a partially rotated configuration.

FIG. 18 is an exemplary schematic diagram illustrating a displacement mechanism disposed between a tray table 1802 and a support arm 1804 with the tray table 1802 in a partially rotated configuration. The tray table 1802 is a table, such as, but not limited to, the tray table 112 in FIG. 1, the tray table 1306 in FIG. 13 and/or the tray table 1600 in FIG. 16.

The tray table 1802 in this example is configured to carry out at least a rotational displacement and a linear displacement between the stowed position and the in-use position. The tray table 1802 with respect to the table support element 1804 rotates about a virtual pivot 1806, such that the tray table 1802 avoids undesirable contact with other elements, such as other furniture structures. Other furniture structures can include the console structures, back shell and/or seat dividing structures during displacement between the use position and the stowed position or vice versa.

The linear displacement and the rotational displacement are configured such that the tray table 1802 carries out a predefined motion along a virtual line and about the virtual pivot 1806, whereas the tray table 1802 does not protrude the virtual line 1808. The table support element 1804 includes a rear end coupled to the carrier unit and a front end pointing away from the carrier unit. The tray table 1802 includes a first lateral side 1810 and second lateral side 1812 (in view of their locations when in the use position) defining a tabletop between them. In the stowed position of the tray table 1802, the first lateral side 1810 is positioned in an area of the rear end and the second lateral side 1812 is positioned in an area of the front end of the table support element 1804. In the use position of the tray table 1802, the first lateral side 1810 is positioned in the area of the front end and the second lateral side is positioned rotated away from the front end about the predefined angle.

For example, when the tray table element is positioned in the stowed position, the first lateral side 1810 is positioned substantially perpendicular to a longitudinal extension axis of the table support element. When the tray table is positioned in the use (rotated) position, the first lateral side is positioned substantially parallel to the longitudinal extension axis.

In some examples, the tray table apparatus includes a linear displacement mechanism via which the tray table is coupled to the tray table support element. The linear displacement mechanism is configured to guide the tray table along the longitudinal extension axis of the table support element. The linear displacement mechanism, in this example, includes at least a linear guide, such as a linear recess, linear receptacle or linear slot, and a corresponding guiding element, such as a ball, pin, bolt, or wheel, movably arranged in the linear guide. In the shown embodiment, the linear guide 1814 is arranged on or in the table support element and the guiding element is arranged on the tray table.

In other examples, a location of the guiding element is predefined. In particular, the location of the guiding element is fixed. The linear displacement mechanism is configured to displace the first lateral side of the tray table along and above the table support element.

Further, the tray table apparatus in other examples includes a rotational displacement mechanism via which the tray table 1802 is coupled to the table support element. The rotational displacement mechanism includes at least a curved guide 1816, such as a curved recess, a curved slot or a curved whole, and a corresponding guide element, such as a ball, pin, bolt, or wheel, movably arranged in the curved guide. In the shown embodiment, the curved rotational guide 1816 is arranged on or in the table support element and the guiding element is arranged on the tray table or vice versa.

In some examples, the rotational displacement mechanism is configured to guide the tray table 1802 in rotational manner with respect to the table support element. A location of the guiding element is predefined. In particular, the location of the guiding element is fixed. The location of the guiding element is different from the location of the guiding element of the linear displacement mechanism. The curved rotational guide 1816 and the linear guide 1818 may merge in an area. Thereby, producing of the guides, such as recesses, may be simplified in one step, e.g., by milling or any other technique. The rotational displacement mechanism is configured to displace the second lateral side 1812 of the tray table about the predefined angle above the table support element.

Figure 19:
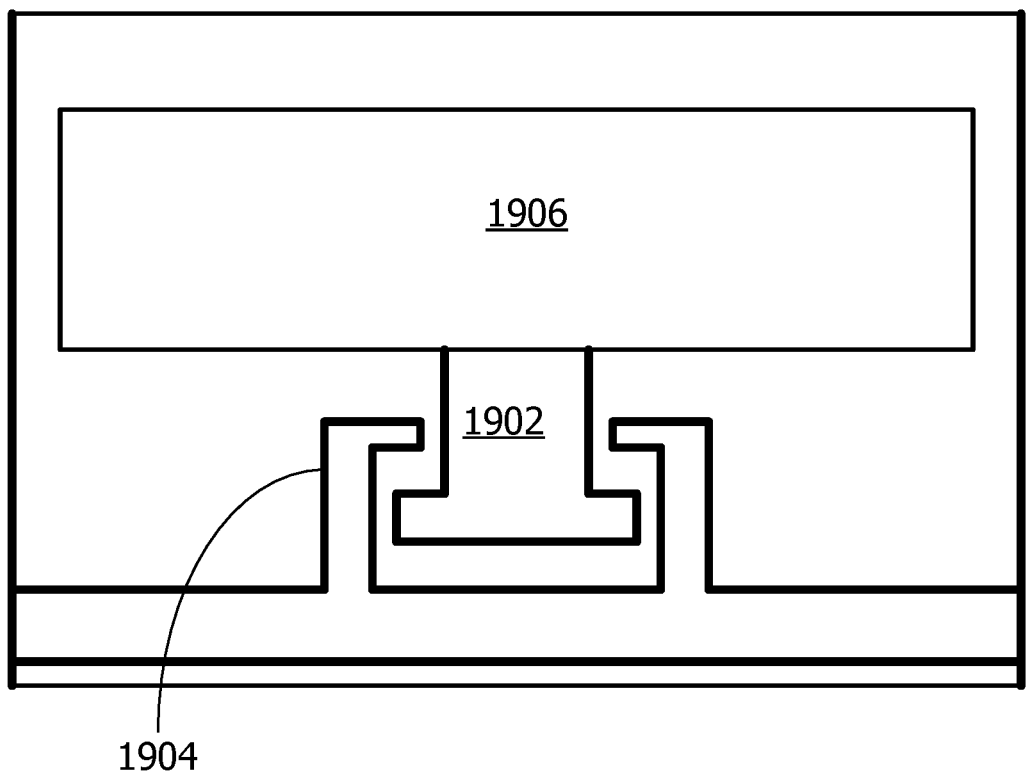
FIG. 19 is an exemplary block diagram illustrating a guiding element within a guide.

FIG. 19 is an exemplary block diagram illustrating a guiding element 1902 within a guide 1904 associated with a tray table 1906. The guiding element 1902 is a guiding element, such as but not limited to, the linear guiding element 1314 and/or the rotational guiding element 1316 of FIG. 13. The guide 1904 is a guide such as, but not limited to, the linear guide 1320 and/or the rotational guide 1330 of FIG. 13. The guiding element 1902 in this example is attached to the underside of the tray table 1906. The guide 1904 is disposed within a support element, such as, but not limited to, the support element 1310 in FIG. 13.

However, in other examples, the guide 1904 is disposed within the tray table 1906. The guiding element 1902 in these examples is attached to the support element. The tray table 1906 in this example is a tray table such as, but not limited to, the tray table 112 in FIG. 1, the tray table 1306 in FIG. 13 and/or the tray table 1600 in FIG. 16.

Figure 20:
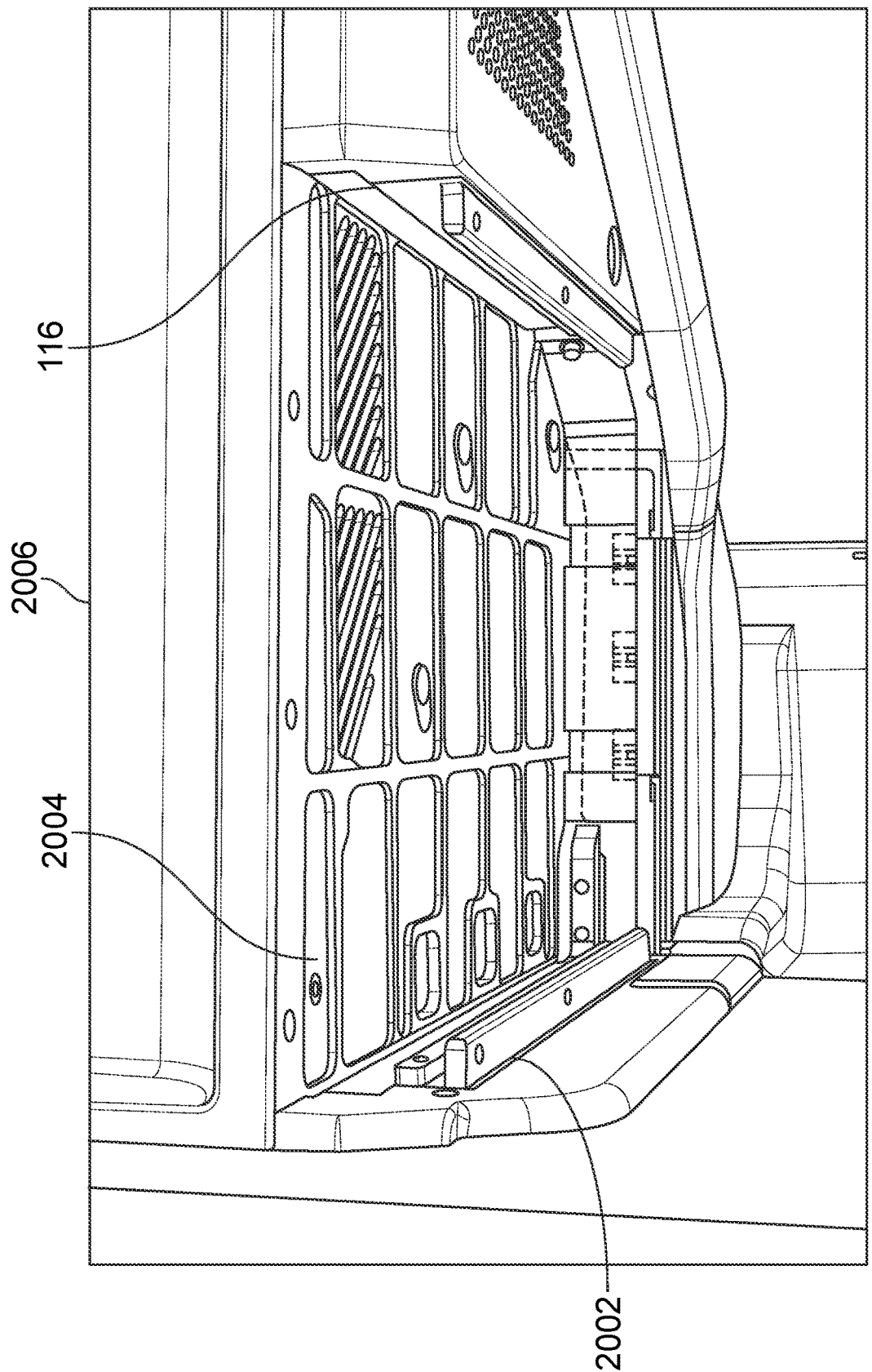
FIG. 20 is an exemplary schematic diagram illustrating a tray mounting device.

FIG. 20 is an exemplary schematic diagram illustrating a tray mounting device 116. The tray mounting device 116 includes a mounting device, such as, but not limited to, a support rail for removably mounting the modular tray table apparatus and a slot 2004 or other open space having a sufficient volume to accommodate the size and/or dimensions of the modular tray table apparatus when the modular tray table apparatus is installed within the console 2006.

Figure 21:
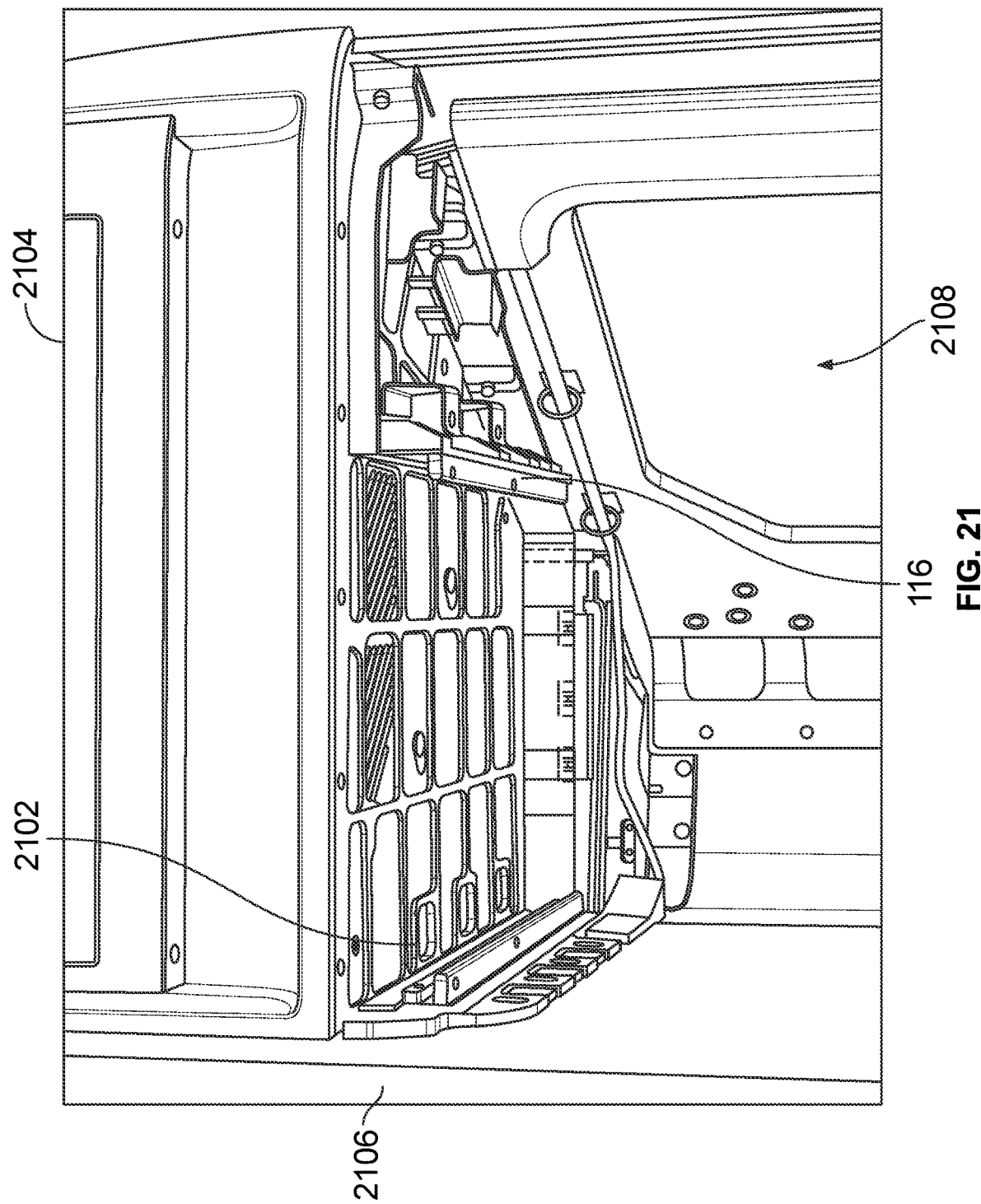
FIG. 21 is an exemplary schematic diagram illustrating a tray mounting device and slot for installation of a modular tray table apparatus within a console.

FIG. 21 is an exemplary schematic diagram illustrating a tray mounting device 116 and slot 2102 for installation of a modular tray table apparatus within a console 2104. The console is a console associated with a seat unit, such as the console 104 in FIG. 1.

In this example, the console 2104 includes a console base structure 2106 with a front utility structure (not visible) and an open rear structure 2108. The tray table apparatus is mounted to the console base structure within the open rear structure 2108. The console base structure 2106, in this example, is configured substantially box-shaped with an upper wall and lateral walls extending in a downward direction from the upper wall creating the open rear structure. The tray table apparatus is held in position in an area of the upper wall after installation.

In other examples, the open rear structure 2108 includes a footwell space for a passenger seated behind the console base structure. The utility structure includes at least one of a shelf, an armrest, a table, storage space and storage means. The storage means can provide storage space for a remote control, magazines, suitcases, shoes, headphones, or other items belonging to the passenger or airline. Additionally, the utility structure, which is positioned next to a corresponding seat of the seat unit, can comprise service and operational elements, such as switches and HMI-panel to control operable features of the seat and/or a seat unit.

Figure 22:
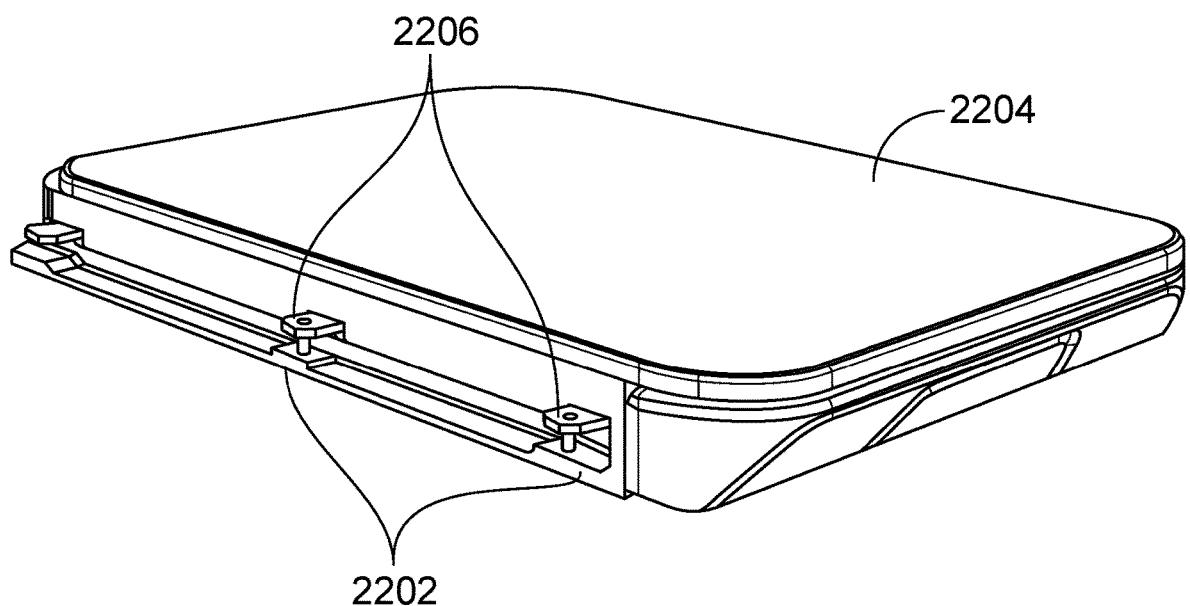
FIG. 22 is an exemplary schematic diagram illustrating a console mounting device on a modular tray table apparatus.

FIG. 22 is an exemplary schematic diagram illustrating a console mounting device 2202 on a modular tray table apparatus 2204. In this example, the tray table apparatus 2204 is configured as a pre-assembled module and the console element is configured with a mounting structure for the tray table apparatus 2204. In particular, the tray table apparatus 2204 with a mounting structure 2206 corresponding to the mounting structure of the console element. The mounting structure 2206 of the tray table apparatus 2204 is arranged outside the housing or carrier unit.

Figure 23:
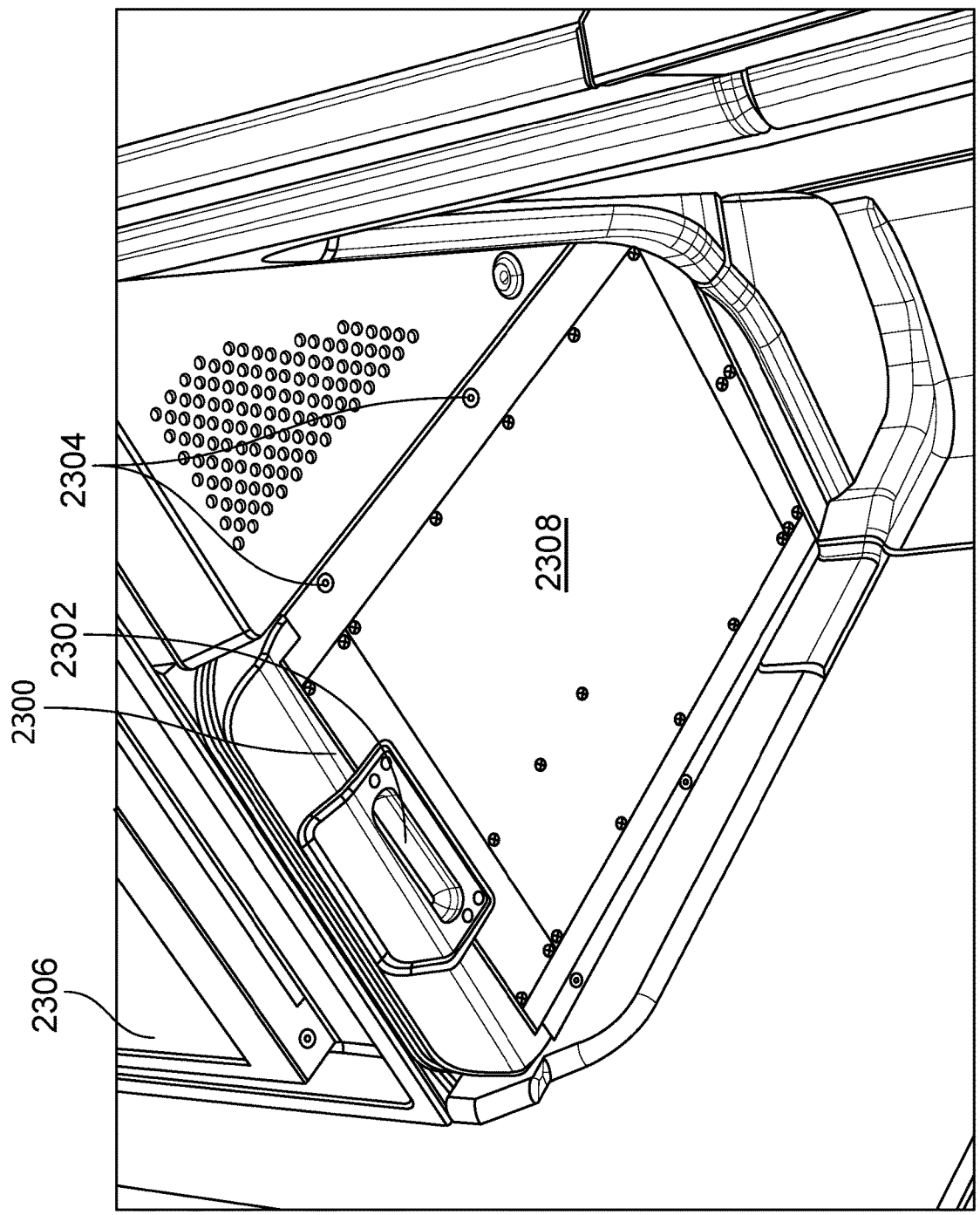
FIG. 23 is an exemplary schematic diagram illustrating mounting of a modular tray table apparatus.

FIG. 23 is an exemplary schematic diagram illustrating mounting of a modular tray table apparatus. 2300. The modular tray table apparatus is a modular device, such as, but not limited to, the modular tray table apparatus 100 in FIG. 1. In this example, the modular tray table apparatus 2300 includes a handle 2302, a set of fastener(s) 2304 removably mounting the modular tray table apparatus to the console 2306 and/or a carrier unit 2308. The modular tray table apparatus in some examples is housed within or on the carrier unit 2308. In other examples, the modular tray table apparatus, including the carrier unit, is housed within a separate housing (not shown).

Figure 24:
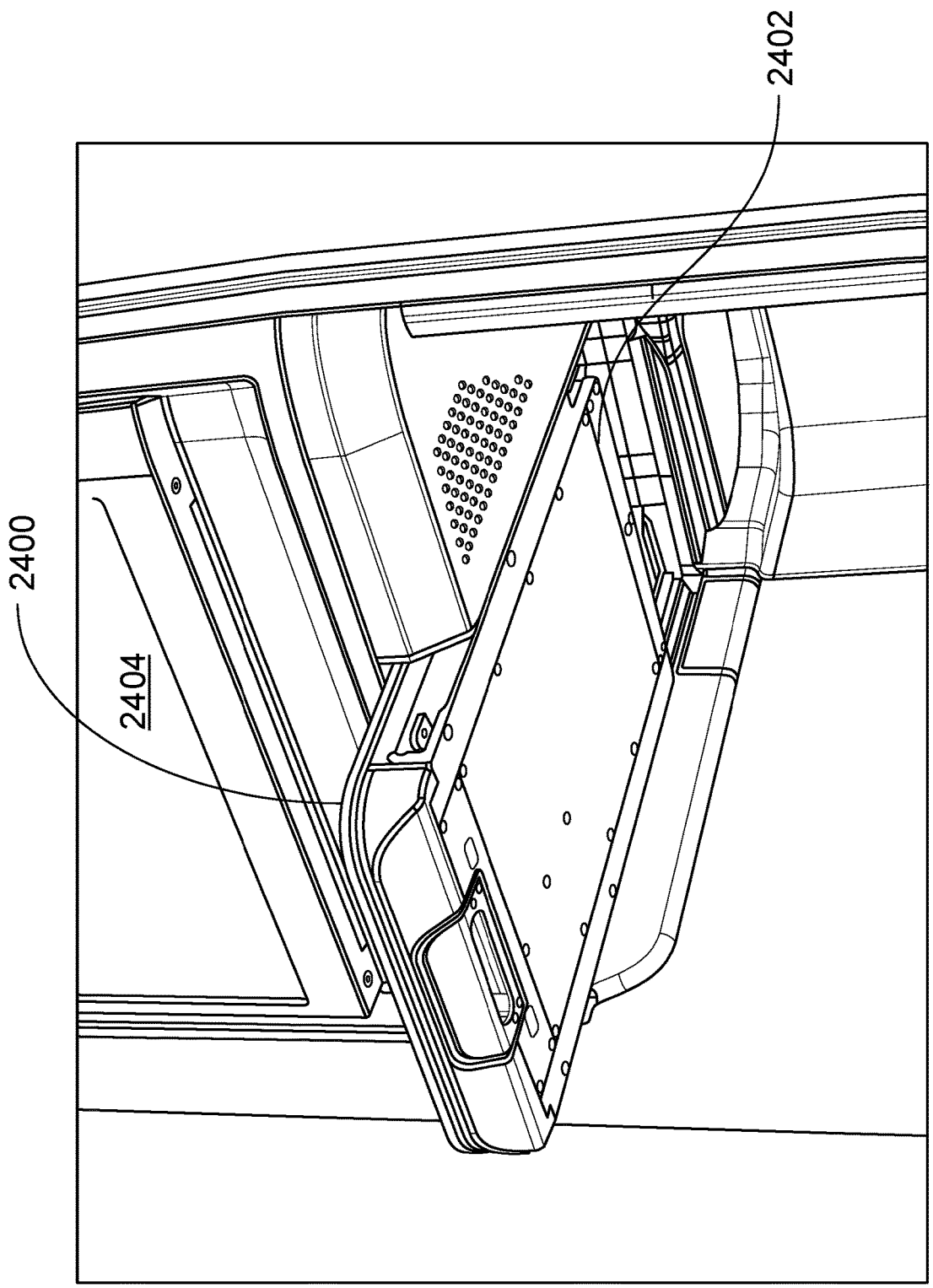
FIG. 24 is an exemplary schematic diagram illustrating removal of a modular tray table apparatus from a console tray mounting device.

FIG. 24 is an exemplary schematic diagram illustrating removal of a modular tray table apparatus 2400 from a console tray mounting device 2402 of a console 2404. The modular tray table apparatus 2400 is a device such as, but not limited to, the modular tray table apparatus 100 in FIG. 1. In this example, the modular tray table apparatus 2400 is being removed from the console. The fastener(s) have been removed from the console mounting device, freeing the module from the console. The modular tray table apparatus slides out of the slot or cassette-type space within the console.

Figure 25:
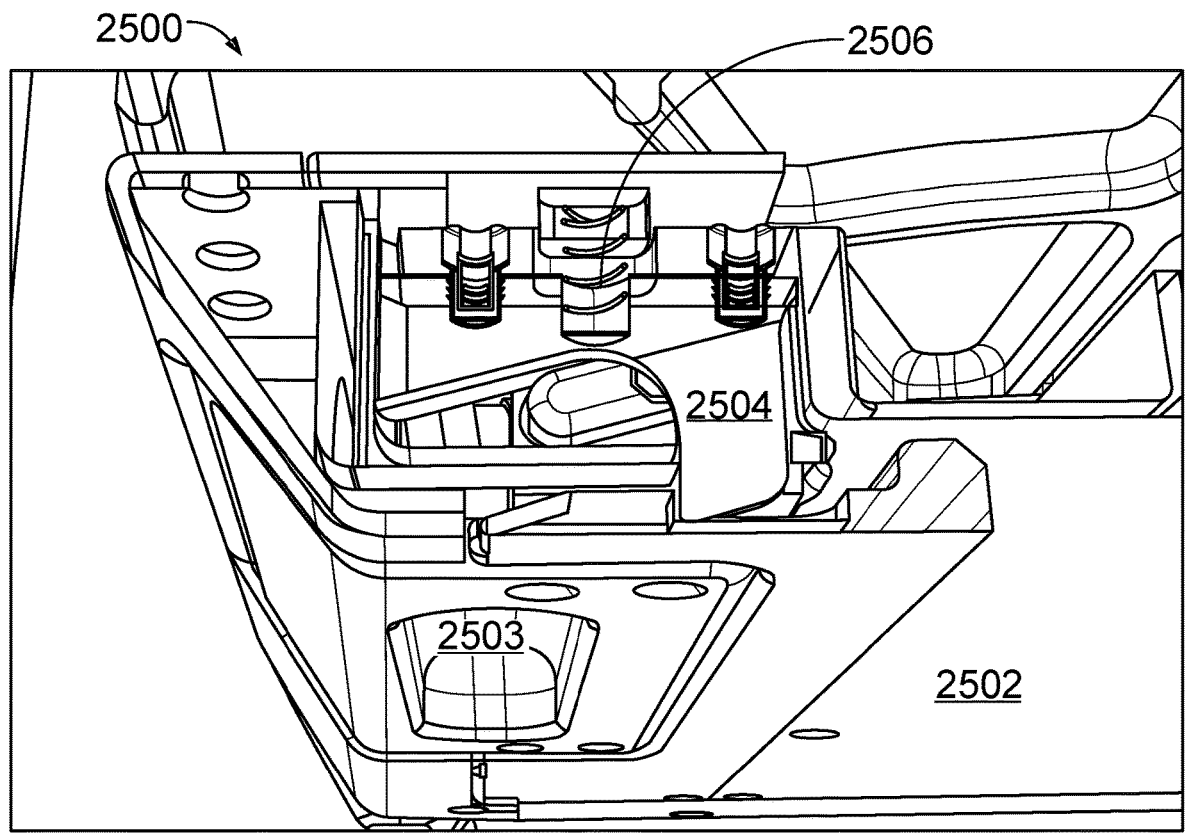
FIG. 25 is an exemplary schematic diagram illustrating a cross-section view of a latch mechanism for securing a modular tray table apparatus within a console while stowed.

FIG. 25 is an exemplary schematic diagram illustrating a cross-section view of a latch mechanism 2500 for securing a modular tray table apparatus 2502 within a console while stowed. In this example, the latch mechanism 2500 is a spring-loaded mechanism in which pulling a handle 2503 lifts an internal latch 2504, which compresses a spring 2506 and frees the tray table and support element(s) from being held in place by the latch.

Figure 26:
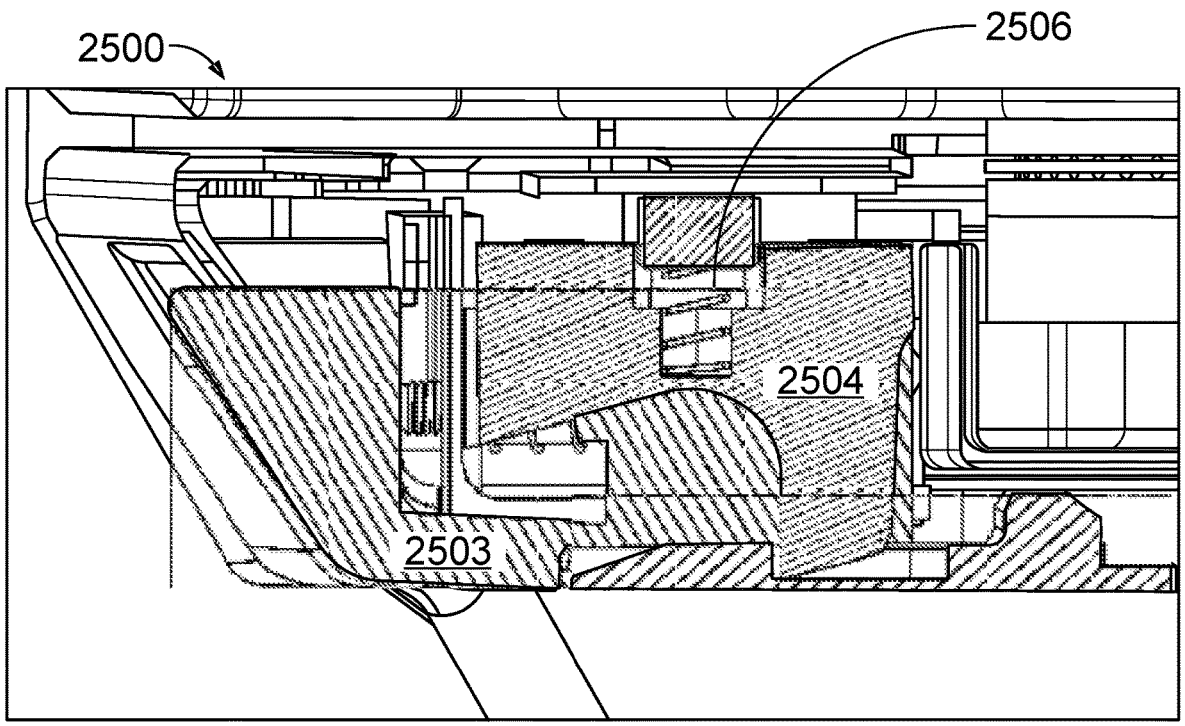
FIG. 26 is an exemplary schematic diagram illustrating a cross-section view of a latched position of the latch mechanism.

FIG. 26 is an exemplary schematic diagram illustrating a cross-section view of a latched position of the latch mechanism 2500. In this example, the latch mechanism is in a locked or latched position holding the tray table in the stowed configuration. The spring 2506 presses down on the latch 2504 securing the tray table to the fixed structure.

Figure 27:
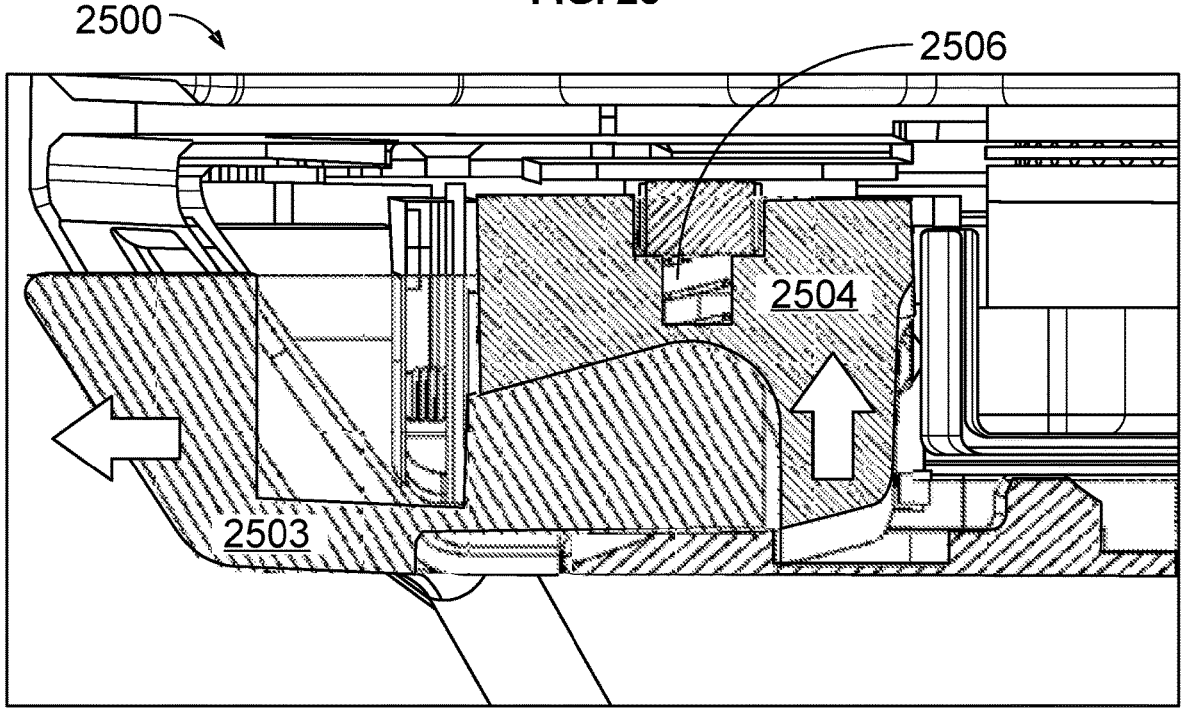
FIG. 27 is an exemplary schematic diagram illustrating a cross-section view of a de-latched position of the latch mechanism.

FIG. 27 is an exemplary schematic diagram illustrating a cross-section view of a de-latched position of the latch mechanism 2500. In this example, lifting the handle 2503 compresses the spring 2506 and lifts the latch 2504 freeing the tray table to deploy out of the console slot. In some examples, when the tray table is unlatched, the tray table automatically slides out of the console by one or two inches along the linear displacement path. By popping out of the console automatically, this alert the user that the tray table is unlatched and ready to be pulled into the deployed position. Likewise, if a user is attempting to stow the tray table, the user can tell the tray table is stowed and latched if there is no linear displacement and the tray table is flush with the console (not sticking out).

Figure 28:
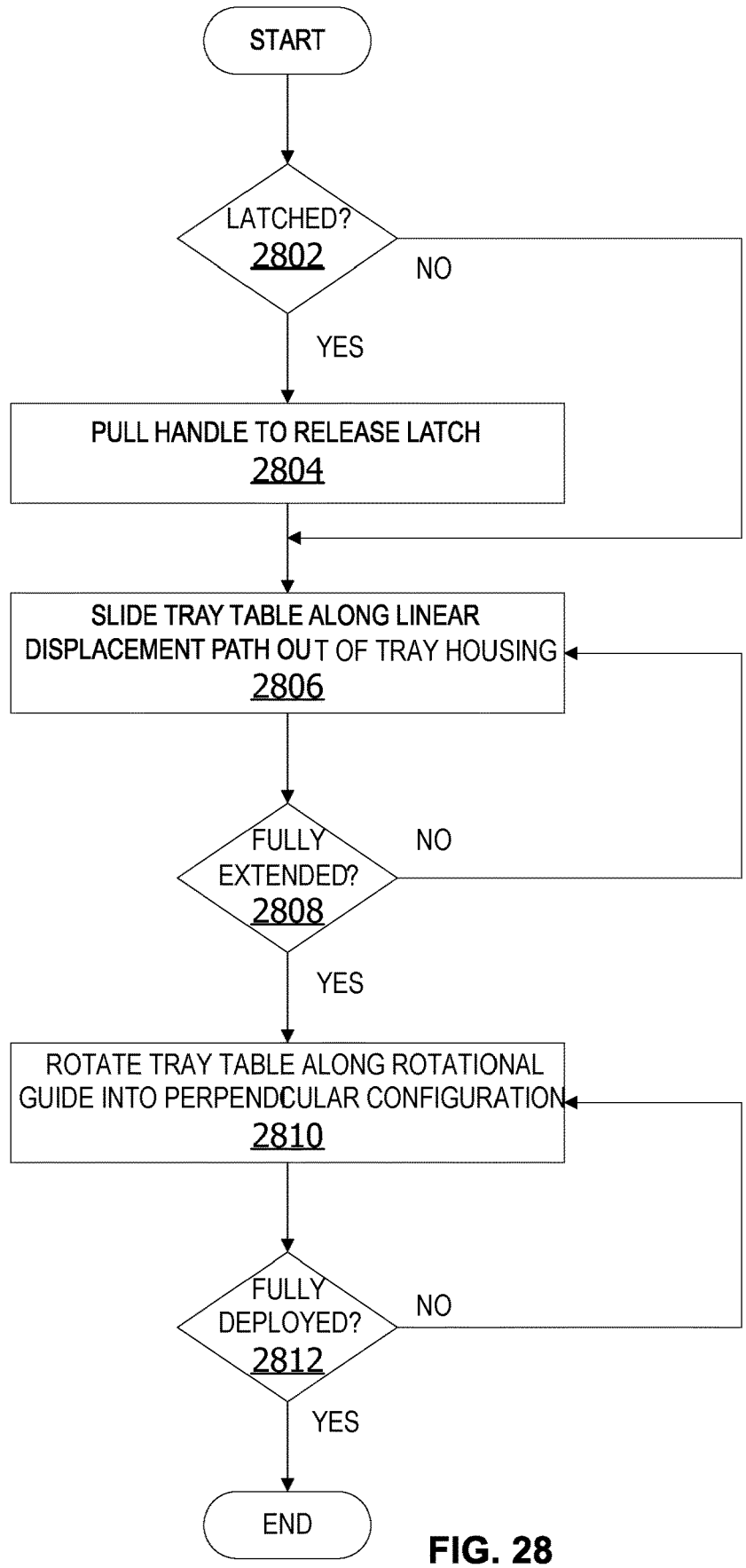
FIG. 28 is an exemplary flow chart illustrating deployment of a tray table from a retracted configuration to a deployed configuration for use.

FIG. 28 is an exemplary flow chart illustrating deployment of a tray table from a retracted configuration to a deployed configuration for use. The process begins by determining if the tray table is latched at 2802. The tray table 1906 in this example is a tray table such as, but not limited to, the tray table 112 in FIG. 1, the tray table 1306 in FIG. 13 and/or the tray table 1600 in FIG. 16. If the tray table is latched, a user pulls the handle 2503 to release the latch at 2804. The tray table slides along a linear displacement path out of the tray housing at 2806. A determination is made whether the tray table is fully extended along the linear displacement path at 2808. If yes, the tray table is rotated along a rotational guide from a parallel orientation into a substantially perpendicular orientation for use at 1810. A determination is made whether the tray table is fully deployed at 1812. If yes, the process terminates.

FIG. 29 is an exemplary table 2900 illustrating a deployment sequence for a stowed tray table. In some examples, a stowed tray table has no linear travel and no rotation. In other words, the stowed tray table is immobile in the parallel orientation within the console tray mounting space/slot. In a de-latched state, the tray table is no longer held in the stowed configuration by the latch mechanism. The tray table slides out beyond the console or outside of the housing when it is unlatched. The housing or carrier unit of the modular tray table apparatus remains mounted inside the console and does not move when the tray table is unlatched.

The full linear deployment in this examples approximately twenty-four and a half inches. The full rotational deployment is approximately ninety-degrees to reach full deployment of the tray for use by a user.

Figure 30:
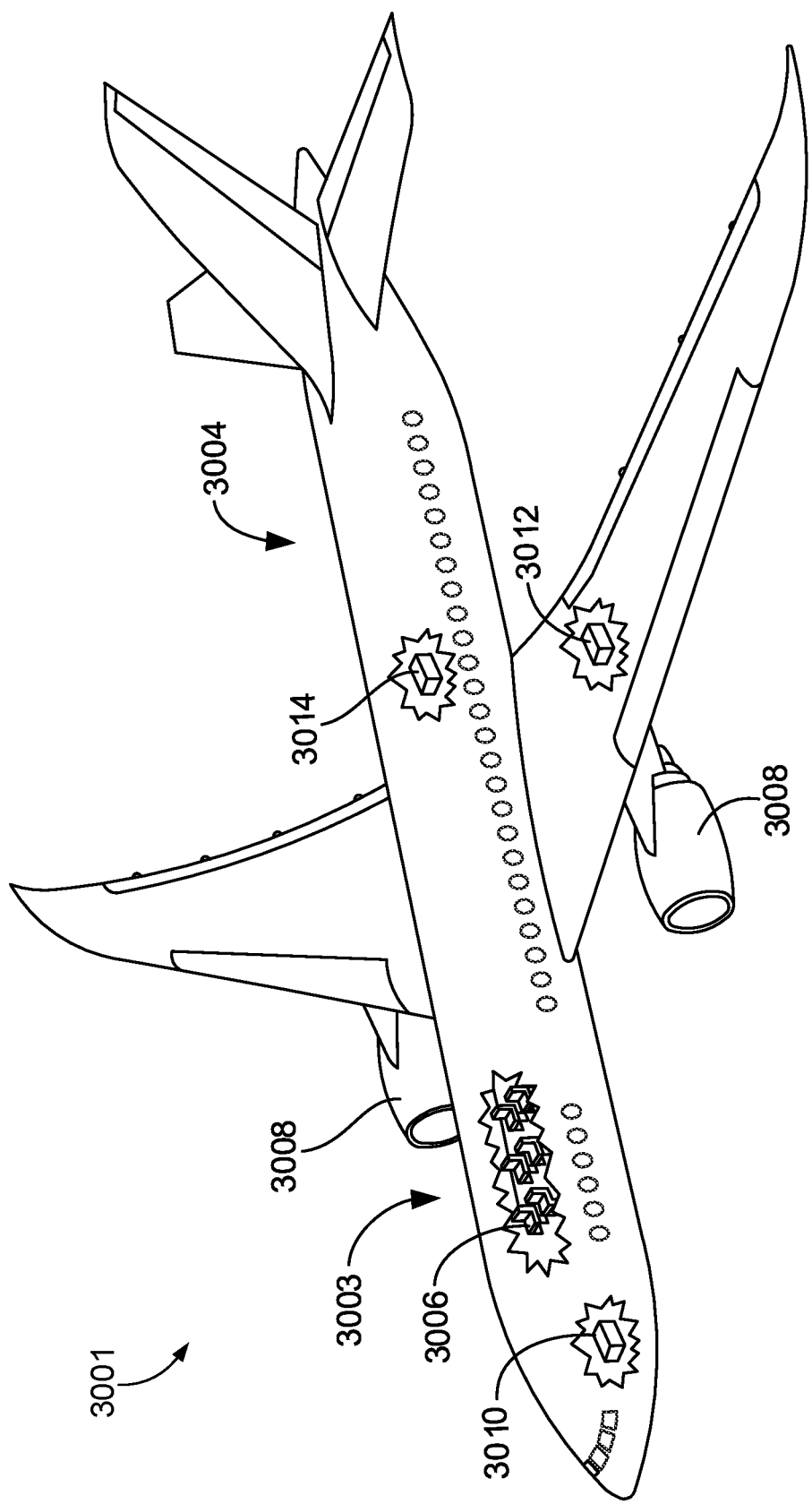
FIG. 30 is a schematic perspective view of a particular flying module.

With reference now to FIG. 30, a more specific diagram of the flying apparatus 3001 is depicted in which an implementation of the disclosure is advantageously employed. In this example, the flying apparatus 3001 includes an airframe 3003 with a plurality of systems 3004 and an interior 3006. In some examples, the flying apparatus 3001 is a vehicle, such as, but not limited to, the vehicle 108 in FIG. 1.

Implementations of the plurality of systems 3004 include one or more of a propulsion system 3008, an electrical system 3010, a hydraulic system 3012, and an environmental system 3014. The system may be implemented in the aircraft cabin within the aircraft. Other systems, not shown, are also candidates for inclusion. Although an aerospace example is shown, different advantageous implementations are applied to other industries, such as the automotive industry, etc.

Additional Examples

The modular tray table apparatus, in some examples, installs within a console element for a seat, in particular an aircraft seat, wherein the console element comprises at least a console base structure with a front utility structure and an open rear structure. The console element comprises a tray table apparatus as described above which is releasable mounted to the console base structure within the open rear structure.

Moreover, the modular tray table apparatus in other examples corresponds to a seat unit, in particular an aircraft seat unit, wherein the seat unit comprises at least one seat and a console element as described above. The console element is arranged substantially laterally relative to the seat and comprises a utility structure for a passenger of the seat and an open rear structure with at least a tray table apparatus for a passenger seated behind the console element.

In some examples, a tray table apparatus is provided for a console element of a seat, in particular an aircraft seat. The tray table apparatus includes at least a carrier unit structure, a tray table support element mounted to the carrier unit structure which is movable between a retracted position and a deployed position, and a table element movably supported on the table support element between at least a stowed position and an in-use (fully deployed) position. The tray table is configured to carry out at least a rotational displacement between the stowed (retracted) position and the in-use (perpendicular) position during movement of the table support element between the retracted position and the fully deployed position.

In still other examples, when the user wishes to stow the tray table, it is not necessary to stepwise initiate stowing by firstly rotating the table element back from its use position to the stowed position and afterwards moving the tray table support element from its deployed position to the retracted position.

In other examples, a tray table apparatus for a console element of a seat, in particular an aircraft seat is provided. The tray table apparatus incudes a carrier structure, a table support element mounted to the carrier structure, and which is movable between a retracted position and a deployed position, and a table element movably supported on the table support element between at least a stowed position and a use position. The table element is configured to carry out at least a rotational displacement between the stowed position and the use position during movement of the table support element. A movement of the table element between the stowed position and the use position comprises a linear displacement and the rotational displacement relative to a longitudinal extension axis of the table support element. The table support element comprises a rear end coupled to the carrier structure and a front end pointing away from the carrier structure and the table element comprises at least first and second lateral sides defining a tabletop between them.

In other examples, in the stowed position, the first lateral side is positioned in an area of the rear end and the second lateral side is positioned in an area of the front end of the table support element, and in the use position, the first lateral side is positioned in the area of the front end and the second lateral side is positioned rotated away from the front end about a predefined angle. In the use position of the table element, the second lateral side is positioned rotated away from the front end at about an angle of 90°.

In still other examples, the table element is coupled to the table support element via at least one linear displacement mechanism provided between the table element and the table support element. The table element is coupled to the table support element via at least one rotational displacement mechanism provided between the table element and the table support element. The linear displacement mechanism comprises at least a linear guide and a corresponding guiding element movably arranged in the linear guide, wherein the linear guide is provided on one of the table support element or the table element and the guiding element is provided on another one of the table support element or the table element.

The rotational displacement mechanism, in some examples, includes at least a curved guide and a corresponding guide element movably arranged in the curved guide, wherein the curved guide is provided on one of the table support element or the table element and the guiding element is provided on another one of the table support element or the table element. The table support element comprises at least a self-stowing mechanism which is configured to automatically move the table element into the stowed position when the table element is at least partially moved back from the use position towards the stowed position. The table support element is movably coupled to the carrier structure in a linear displaceable manner. The table support element comprises an upper support arm and a lower support arm which are adjustable relative to one another and to the carrier structure.

In other examples, the tray table apparatus is configured as a pre-assembled module. A console element for a seat, in particular an aircraft seat, in these examples, includes at least a console base structure with a front utility structure and an open rear structure and a tray table apparatus, wherein the tray table apparatus is releasable mounted to the console base structure within the open rear structure.

In other examples, a seat unit, in particular an aircraft seat unit, includes a seat and a console element. The console element is arranged substantially laterally relative to the seat and comprises a front utility structure for a passenger of the seat and an open rear structure with at least a tray table apparatus for a passenger seated behind the console element.

The following paragraphs describe further aspects of the disclosure. In some implementations, the paragraphs described below can be further combined in any subcombination without departing from the scope of the present disclosure.

1A. A modular tray table apparatus comprising:
  a tray table carrier unit removably mounted to a console of a seat unit;
  a tray table support element coupled to the carrier unit and a tray table, the tray table support element movably supports the tray table along a linear displacement path between a fully retracted configuration and at least one deployed configuration; and
  a rotational displacement mechanism disposed between the tray table and the tray table support element, wherein the tray table slides along a rotational displacement path defined by at least one rotational guide between a linear configuration of the tray table and a substantially perpendicular configuration of the tray table.

2A. The modular tray table apparatus of claim 1, wherein the rotational displacement mechanism further comprises:
  at least one rotational guiding element attached to a bottom surface of the tray table and disposed within at least one rotational guide, wherein the at least one rotational guiding element slidably moves from the linear configuration into the perpendicular configuration during deployment of the tray table.

3A. The modular tray table apparatus of claim 1, further comprising:
  at least one linear guiding element attached to a bottom surface of the tray table and disposed within at least one linear guide, wherein the at least one linear guiding element slidably moves along the linear path from the retracted configuration into the deployed configuration.

4A. The modular tray table apparatus of claim 1, wherein the rotational displacement mechanism further comprises:
  at least one rotational guiding element associated with the tray table support element and a rotational guide associated with at least a portion of a bottom surface of the tray table, wherein the at least one rotational guiding element is disposed within the at least one rotational guide, wherein the at least one rotational guiding element slidably moves from the linear configuration into the perpendicular configuration during deployment of the tray table.

5A. The modular tray table apparatus of claim 1, further comprising:
  at least one linear guiding element associated with the tray table support element; and
  at least one linear guide within a bottom surface of the tray table, wherein the at least one linear guiding element slidably moves along the linear path from the retracted configuration into the deployed configuration.

6A. The modular tray table apparatus of claim 1, wherein the rotational displacement path defined by the at least one rotational guide between the linear configuration of the tray table and the substantially perpendicular configuration of the tray table is a ninety-degree arc of rotation.

7A. The modular tray assembly of claim 1, further comprising:
  a linear displacement mechanism disposed between the tray table and the tray table support element, wherein the tray table is coupled to the tray table support element via the linear displacement mechanism, and wherein the linear displacement mechanism enables linear movement of the tray table along the linear displacement path between the fully retracted configuration and the at least one deployed configuration.

8A. The modular tray table apparatus of claim 1, further comprising:
a latching mechanism associated with a housing of the modular tray assembly, wherein the latching mechanism holds the tray table within the housing when the tray table is stowed in the retracted configuration.

9A. The modular tray table apparatus of claim 8, further comprising:
a handle of the tray table, wherein pulling the handle in the retracted configuration releases the latching mechanism to free the tray table from the housing for deployment of the tray table.

10A. The modular tray table apparatus of claim 1, wherein the tray table support element further comprises:
a first telescoping tray table support arm coupled to the carrier unit; and
a second telescoping tray table support arm comprising a first end and a second end, the first end of the second telescoping tray table support arm coupled to the first telescoping tray support arm and the second end of the second telescoping tray table support arm coupled to the tray table.

11A. The modular tray table apparatus of claim 1, further comprising:
a self-stowing mechanism which is configured to automatically move the tray table from the deployed configuration into the retracted configuration when the tray table is at least partially moved back from the fully retracted configuration towards a console of the seat unit.

12A. A method for deploying a tray table of a modular tray table apparatus, the method comprising:
actuating a decoupling latch associated with the tray table to disengage a latching device and detach the tray table from the modular tray table apparatus housing within a console element of associated with a seat unit;
sliding the tray table along a linear displacement path between a fully retracted configuration of the tray table within the housing and at least one deployed configuration of the tray table outside of the housing; and
rotating the tray table via a rotational displacement mechanism disposed between the tray table and a tray table support element, wherein the tray table slides along a rotational displacement path defined by at least one rotational guide between a linear configuration of the tray table and a substantially perpendicular configuration of the tray table when in a fully deployed configuration.

13A. The method of claim 12, further comprising:
latching the tray table in the retracted configuration within the housing via a latching mechanism, wherein the latching mechanism holds the tray table within the housing when the tray table is stowed in the retracted configuration.

14A. The method of claim 12, further comprising:
automatically moving the tray table from the deployed configuration into the retracted configuration when the tray table is at least partially moved back from the fully retracted configuration towards a console of the seat unit via a self-stowing mechanism.

15A. A system for a modular tray table comprising:
a tray table carrier unit removably mounted to a console of a seat unit;
a tray table support element coupled to the carrier unit and a tray table, the tray table support element movably supports the tray table;
a linear displacement mechanism disposed between the tray table and the tray table support element, wherein the tray table slides along a linear displacement path between a fully retracted configuration and at least one deployed configuration;
a rotational displacement mechanism disposed between the tray table and the tray table support element, wherein the tray table slides along a rotational displacement path defined by at least one rotational guide between a linear configuration of the tray table and a substantially perpendicular configuration of the tray table; and
a latching mechanism associated with a housing of the modular tray assembly, wherein the latching mechanism holds the tray table within the housing when the tray table is stowed in the retracted configuration.

16A. The system of claim 15, wherein the tray table support element further comprises:
a first tray table support arm coupled to the carrier unit; and
a second tray table support arm coupled to the first tray table support arm and the tray table.

17A. The system of claim 15, wherein the tray table support element further comprises:
at least one set of telescoping rails coupled to the tray table, wherein the at least one set of telescoping rails extend from a nested position in the retracted configuration into an extended position in the at least one deployed configuration.

18A. The system of claim 15, further comprising:
at least one linear guiding element attached to a bottom surface of the tray table and disposed within at least one linear guide on at least a portion of the tray table support element, wherein the at least one linear guiding element slidably moves along the linear path from the retracted configuration into the deployed configuration.

19A. The system of claim 15, further comprising:
at least one rotational guiding element associated with the tray table support element and a rotational guide associated with at least a portion of a bottom surface of the tray table, wherein the at least one rotational guiding element is disposed within the at least one rotational guide, wherein the at least one rotational guiding element slidably moves from the linear configuration into the perpendicular configuration during deployment of the tray table.

20A. The system of claim 15, wherein the rotational displacement path defined by the at least one rotational guide between the linear configuration of the tray table and the substantially perpendicular configuration of the tray table is a ninety-degree arc of rotation.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, and FIG. 27 can be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, and FIG. 27, or a component not shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, and FIG. 27.

While the aspects of the disclosure have been described in terms of various examples with their associated operations, a person skilled in the art would appreciate that a combination of operations from any number of different examples is also within scope of the aspects of the disclosure.

While the aspects of the disclosure have been described in terms of various examples with their associated operations, a person skilled in the art would appreciate that a combination of operations from any number of different examples is also within scope of the aspects of the disclosure.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either", "one of", "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A modular tray table apparatus comprising:
   a tray table carrier unit removably mounted to a console of a seat unit;
   a tray table support element coupled to the tray table carrier unit and a tray table, the tray table support element movably supporting the tray table along a linear displacement path between a retracted configuration and at least one deployed configuration; and
   a rotational displacement mechanism disposed between the tray table and the tray table support element, the rotational displacement mechanism having at least one rotational guide defining a rotational displacement path and at least one rotational guiding element arranged in the at least one rotational guide for sliding movement along the rotational displacement path to facilitate movement of the tray table between a linear configuration and a substantially perpendicular configuration during deployment of the tray table.

2. The modular tray table apparatus of claim 1, further comprising:
   at least one linear guiding element attached to a bottom surface of the tray table and disposed within at least one linear guide, wherein the at least one linear guiding element slidably moves along the linear displacement path from the retracted configuration into the deployed configuration.

3. The modular tray table apparatus of claim 1, further comprising:
   at least one linear guiding element associated with the tray table support element; and at least one linear guide within a bottom surface of the tray table, wherein the at least one linear guiding element slidably moves along the linear displacement path from the retracted configuration into the deployed configuration.

4. The modular tray table apparatus of claim 1, wherein the rotational displacement path defined by the at least one rotational guide between the linear configuration of the tray table and the substantially perpendicular configuration of the tray table is a ninety-degree arc of rotation.

5. The modular tray apparatus of claim 1, further comprising:
a linear displacement mechanism disposed between the tray table and the tray table support element, wherein the tray table is coupled to the tray table support element via the linear displacement mechanism, and wherein the linear displacement mechanism enables linear movement of the tray table along the linear displacement path between the retracted configuration and the at least one deployed configuration.

6. The modular tray table apparatus of claim 1, further comprising:
a latching mechanism associated with a housing of the modular tray apparatus, wherein the latching mechanism holds the tray table within the housing when the tray table is stowed in the retracted configuration.

7. The modular tray table apparatus of claim 6, further comprising:
a handle of the tray table, wherein pulling the handle in the retracted configuration releases the latching mechanism to free the tray table from the housing for deployment of the tray table.

8. The modular tray table apparatus of claim 1, wherein the tray table support element further comprises:
a first telescoping tray table support arm coupled to the tray table carrier unit; and
a second telescoping tray table support arm comprising a first end and a second end, the first end of the second telescoping tray table support arm coupled to the first telescoping tray support arm and the second end of the second telescoping tray table support arm coupled to the tray table.

9. The modular tray table apparatus of claim 1, further comprising:
a self-stowing mechanism including a spring device coupling the rotational displacement mechanism to automatically move the tray table from the deployed configuration into the retracted configuration when the tray table is at least partially moved back from the retracted configuration towards a console of the seat unit.

10. The modular tray table apparatus of claim 1, wherein the at least one rotational guide is arranged on the tray table support element and the at least one rotational guiding element is arranged on the tray table.

11. The modular tray table apparatus of claim 1, wherein the at least one rotational guide is arranged on the tray table and the at least one rotational guiding element is arranged on the tray table support element.

12. A system for a modular tray table comprising:
a tray table carrier unit removably mounted to a console of a seat unit;
a tray table support element coupled to the tray table carrier unit and a tray table, the tray table support element movably supports the tray table;
a linear displacement mechanism disposed between the tray table and the tray table support element, wherein the tray table slides along a linear displacement path between a retracted configuration and at least one deployed configuration;
a rotational displacement mechanism disposed between the tray table and the tray table support element, the rotational displacement mechanism having at least one rotational guide defining a rotational displacement path and at least one rotational guiding element arranged in the at least one rotational guide for sliding movement along the rotational displacement path to facilitate movement of the tray table between a linear configuration and a perpendicular configuration during deployment of the tray table; and
a latching mechanism associated with the modular tray table, wherein the latching mechanism holds the tray table in the retracted configuration.

13. The system of claim 12, wherein the tray table support element further comprises:
a first tray table support arm coupled to the tray table carrier unit; and
a second tray table support arm coupled to the first tray table support arm and the tray table.

14. The system of claim 12, wherein the tray table support element further comprises:
at least one set of telescoping rails coupled to the tray table, wherein the at least one set of telescoping rails extend from a nested position in the retracted configuration into an extended position in the at least one deployed configuration.

15. The system of claim 12, further comprising:
at least one linear guiding element attached to a bottom surface of the tray table and disposed within at least one linear guide on at least a portion of the tray table support element, wherein the at least one linear guiding element slidably moves along the linear displacement path from the retracted configuration into the deployed configuration.

16. The system of claim 12, wherein the at least one rotational guide is arranged on the tray table support element and the at least one rotational guiding element is arranged on the tray table.

17. The system of claim 12, wherein the at least one rotational guide is arranged on the tray table and the at least one rotational guiding element is arranged on the tray table support element.

18. A system for a modular tray table comprising:
a tray table;
a tray table carrier unit removably mounted to a console of a seat unit;
a tray table support element coupled to the tray table carrier unit and the tray table to movably support the tray table along a linear displacement path between a retracted configuration and at least one deployed configuration; and
a rotational displacement mechanism disposed between the tray table and the tray table support element, the rotational displacement mechanism having a rotational guide defining a rotational displacement path and a rotational guiding element arranged in the at least one rotational guide for sliding movement along the rotational displacement path to reorient the tray table from the linear displacement path to a substantially perpendicular configuration during deployment of the tray table.

19. The system of claim 18, wherein the rotational guide is arranged on the tray table support element and the rotational guiding element is arranged on the tray table.

20. The system of claim 18, wherein the rotational guide is arranged on the tray table and the rotational guiding element is arranged on the tray table support element.

* * * * *